United States Patent
Song et al.

(10) Patent No.: US 11,861,499 B2
(45) Date of Patent: Jan. 2, 2024

(54) METHOD, TERMINAL-SIDE DEVICE, AND CLOUD-SIDE DEVICE FOR DATA PROCESSING AND TERMINAL-CLOUD COLLABORATION SYSTEM

(71) Applicant: HUAWEI TECHNOLOGIES CO., LTD., Guangdong (CN)

(72) Inventors: Fenglong Song, Beijing (CN); Wulong Liu, Beijing (CN); Xijun Xue, Shenzhen (CN); Huimin Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 1131 days.

(21) Appl. No.: 16/452,290

(22) Filed: Jun. 25, 2019

(65) Prior Publication Data
US 2019/0318245 A1   Oct. 17, 2019

Related U.S. Application Data

(63) Continuation of application No. PCT/CN2017/116203, filed on Dec. 14, 2017.

(30) Foreign Application Priority Data

Dec. 26, 2016   (CN) .......................... 201611215479.6

(51) Int. Cl.
*G06E 1/00* (2006.01)
*G06N 3/082* (2023.01)
(Continued)

(52) U.S. Cl.
CPC ........... *G06N 3/082* (2013.01); *G06F 9/5011* (2013.01); *G06F 9/5027* (2013.01); *G06N 3/063* (2013.01)

(58) Field of Classification Search
CPC ...... G06N 3/082; G06N 3/063; G06F 9/5011; G06F 9/5027
See application file for complete search history.

(56) References Cited

U.S. PATENT DOCUMENTS 9,607,366 B1 *   3/2017   Brailovskiy ......... G06V 10/507
9,747,440 B2 *   8/2017   Gupta ................. G06F 11/3013
(Continued)

FOREIGN PATENT DOCUMENTS

CN   102427577 A   4/2012
CN   102916940 A   2/2013
(Continued)

OTHER PUBLICATIONS

Song Han et al. Deep Compression: Compressing Deep Neural Networks With Pruning, Trained Quantization and Huffman Coding, ICLR 2016, pp. 1-14.
(Continued)

*Primary Examiner* — Tammy E Lee
(74) *Attorney, Agent, or Firm* — WOMBLE BOND DICKINSON (US) LLP

(57) ABSTRACT

This application provides a method, a terminal-side device, and a cloud-side device for data processing and a terminal-cloud collaboration system. The method includes: sending, by the terminal-side device, a request message to the cloud-side device; receiving, by the terminal-side device, a second neural network model that is obtained by compressing a first neural network model and that is sent by the cloud-side device, where the first neural network model is a neural network model on the cloud-side device that is used to process the cognitive computing task, and a hardware resource required when the second neural network model runs on the terminal-side device is within an available hardware resource capability range of the terminal-side device; and processing, by the terminal-side device, the
(Continued)

cognitive computing task based on the second neural network model.

31 Claims, 9 Drawing Sheets

(51) Int. Cl.
   *G06F 9/50*    (2006.01)
   *G06N 3/063*   (2023.01)

(56)            References Cited

U.S. PATENT DOCUMENTS

| | | | |
|---|---|---|---|
| 10,229,356 B1* | 3/2019 | Liu | ............ G10L 15/16 |
| 2003/0074483 A1 | 4/2003 | Minow | |
| 2006/0031539 A1 | 2/2006 | Ferris et al. | |
| 2007/0250565 A1 | 10/2007 | Minow | |
| 2009/0177711 A1 | 7/2009 | Ferris et al. | |
| 2011/0258254 A1 | 10/2011 | Ferris et al. | |
| 2014/0026031 A1 | 1/2014 | Ferris et al. | |
| 2015/0242747 A1* | 8/2015 | Packes | ............ G06N 3/0454 |
| | | | 706/17 |
| 2016/0078339 A1 | 3/2016 | Li et al. | |
| 2016/0217369 A1* | 7/2016 | Annapureddy | ......... G06N 3/04 |
| 2016/0358070 A1 | 12/2016 | Brothers et al. | |
| 2017/0148444 A1* | 5/2017 | Bocklet | ............ G10L 15/01 |
| 2017/0185873 A1 | 6/2017 | Wang et al. | |

FOREIGN PATENT DOCUMENTS

| | | |
|---|---|---|
| CN | 103312788 A | 9/2013 |
| CN | 104346214 A | 2/2015 |
| CN | 104767810 A | 7/2015 |
| CN | 105575389 A | 5/2016 |
| CN | 105760224 A | 7/2016 |
| WO | 2013070152 A2 | 5/2013 |
| WO | 2016041442 A1 | 3/2016 |

OTHER PUBLICATIONS

Xue Xijun et al. Cognitive computing enters a new phase, Huawei Publications, Apr. 7, 2015, total 7 pages.

* cited by examiner

METHOD, TERMINAL-SIDE DEVICE, AND CLOUD-SIDE DEVICE FOR DATA PROCESSING AND TERMINAL-CLOUD COLLABORATION SYSTEM

CROSS-REFERENCE TO RELATED APPLICATIONS

This application is a continuation of International Application No. PCT/CN2017/116203, filed on Dec. 14, 2107, which claims priority to Chinese Patent Application No. 201611215479.6, filed on Dec. 26, 2016. The disclosures of the aforementioned applications are hereby incorporated by reference in their entireties.

TECHNICAL FIELD

This application relates to the field of data processing, and more specifically, to a method, a terminal-side device, and a cloud-side device for data processing and a terminal-cloud collaboration system.

BACKGROUND

A requirement for an intelligent application of a terminal-side device increasingly grows. A typical intelligent application scenario includes an intelligent mobile terminal, a robot, a driverless car, a safe city, a smart city, the Internet of Things, and the like. A requirement for the intelligent application of the terminal-side device increasingly grows in an intelligent application scenario. The intelligent application typically features a large data amount and a large computation amount, and needs a large storage capacity during running. A computation kernel in a computing program of the intelligent application is mainly machine learning, and in particular, a neural network. This type of program features a large computation amount and needs a large storage capacity during running. However, the terminal-side device (such as a smartphone, a tablet computer, a smart camera, smart glasses, a robot, or a smart sensor) typically features a relatively weak computing capability and a limited storage capacity integrated in the device, and the computing capability and the storage capacity are much lower than those of a high-performance server. Consequently, the terminal-side device cannot efficiently perform computation to meet a computing requirement in the intelligent application scenario, and expansion of an intelligent application feature of the terminal-side device is limited.

SUMMARY

This application provides a method, a terminal-side device, and a cloud-side device for data processing and a terminal-cloud collaboration system, so as to improve performance of processing a neural network-related application by the terminal-side device, and help enhance expansion of an intelligent application capability of the terminal-side device.

According to a first aspect, a method for data processing is provided, and the method includes: sending, by a terminal-side device, a request message to a cloud-side device, where the request message is used to request a neural network model used to process a cognitive computing task; receiving, by the terminal-side device, a second neural network model that is obtained by trimming a first neural network model and that is sent by the cloud-side device, where the first neural network model is a neural network model on the cloud-side device that is used to process the cognitive computing task, and a hardware resource required when the second neural network model runs is within an available hardware resource capability range of the terminal-side device; and processing, by the terminal-side device, the cognitive computing task based on the second neural network model.

In one embodiment, the terminal-side device requests, from the cloud-side device, the neural network model used to process the cognitive computing task, and after trimming the neural network model capable of processing the cognitive computing task, the cloud-side device delivers the trimmed neural network model to the terminal-side device, where a hardware resource required when the trimmed neural network model runs is within the available hardware resource capability range of the terminal-side device, so that a neural network model that originally runs on the cloud-side device with a strong computing capability can also be applicable to the terminal-side device with a relatively weak computing capability, and the terminal-side device can process the cognitive computing task. Therefore, the solution provided in this application can improve performance of processing a neural network-related application by the terminal-side device, and help enhance expansion of an intelligent application capability of the terminal-side device.

In one embodiment, the terminal-side device includes a neural network basic platform, the neural network basic platform includes a neural network architecture component and a neural network parameter component, and the neural network architecture component is decoupled from the neural network parameter component; and the processing, by the terminal-side device, the cognitive computing task based on the second neural network model includes: when the second neural network model includes an architecture update component, updating the neural network architecture component based on the architecture update component; when the second neural network model includes a parameter update component, updating the neural network parameter component based on the parameter update component; and processing the cognitive computing task based on an updated neural network basic platform.

In this solution, the neural network basic platform on the terminal-side device includes the neural network architecture component and the neural network parameter component, and the neural network architecture component is decoupled from the neural network parameter component. In other words, an update to the neural network parameter component and an update to the neural network architecture component are independent of each other and do not affect each other. This can help extend an intelligent application function of the terminal-side device.

In one embodiment, the sending, by a terminal-side device, a request message to a cloud-side device includes: sending, by the terminal-side device, the request message to the cloud-side device under any one of the following conditions: the terminal-side device lacks a neural network model used to process the cognitive computing task; accuracy of processing the cognitive computing task by using a neural network model on the terminal-side device does not meet cognitive accuracy tolerance; and a hardware resource required when a neural network model on the terminal-side device that is used to process the cognitive computing task runs exceeds an available hardware resource capability of the terminal-side device, where the cognitive accuracy tolerance represents expected accuracy of processing the cognitive computing task by the terminal-side device.

In one embodiment, under any one of the foregoing conditions, the terminal-side device actively requests, from the cloud-side device, the neural network model used to process the cognitive computing task, so as to effectively achieve an objective that the terminal-side device has a function of processing a neural network-related application, and help enhance expansion of an intelligent application capability of the terminal-side device.

In one embodiment, the request message carries indication information used to indicate the cognitive accuracy tolerance, so that the cloud-side device trims the first neural network model to obtain the second neural network model that meets the cognitive accuracy tolerance, where the cognitive accuracy tolerance represents the expected accuracy of processing the cognitive computing task by the terminal-side device.

In one embodiment, when requesting, from the cloud-side device, the neural network model used to process the cognitive computing task, the terminal-side device further reports the indication information used to indicate the cognitive accuracy tolerance, so that the neural network model delivered by the cloud-side device can meet a requirement for the cognitive accuracy tolerance. Therefore, in the technical solution provided in this application, the terminal-side device can invoke, based on a hardware resource of the terminal-side device, the neural network model received from the cloud-side device, to process the cognitive computing task; in addition, accuracy of processing the cognitive computing task can be ensured, so that the performance of processing the neural network-related application by the terminal-side device can be further improved.

In the foregoing implementations, accuracy of processing the cognitive computing task by using the second neural network model delivered by the cloud-side device to the terminal-side device is consistent with accuracy corresponding to the cognitive accuracy tolerance. In other words, the accuracy of processing the cognitive computing task by using the second neural network model is not much higher than the accuracy corresponding to the cognitive accuracy tolerance.

It should be understood that higher accuracy of processing the cognitive computing task by using the neural network model correspondingly indicates a larger computation amount and a larger storage capacity required. In this solution, hardware resources required for the neural network model are reduced to a relatively large extent on the premise that the accuracy of processing the cognitive computing task by using the neural network model delivered by the cloud-side device to the terminal-side device meets the cognitive accuracy tolerance, so as to reduce load of the hardware resources required when the neural network model runs on the terminal-side device.

In one embodiment, the request message carries indication information used to indicate the available hardware resource capability of the terminal-side device.

In one embodiment, the request message further carries an identifier used to indicate the first neural network model, so that the cloud-side device determines the first neural network model based on the identifier; or the request message further carries function information, where the function information is used to describe a function of processing the cognitive computing task, so that the cloud-side device determines the first neural network model based on the function information.

In one embodiment, a computation amount and a required storage capacity of the second neural network model are respectively less than a computation amount and a required storage capacity of the first neural network model.

According to a second aspect, a method for data processing is provided, and the method includes: receiving, by a cloud-side device, a request message sent by a terminal-side device, where the request message is used to request a neural network model used to process a cognitive computing task; determining, by the cloud-side device based on the request message, a first neural network model used to process the cognitive computing task; trimming, by the cloud-side device, the first neural network model to obtain a second neural network model, where a hardware resource required when the second neural network model runs is within an available hardware resource capability range of the terminal-side device; and sending, by the cloud-side device, the second neural network model to the terminal-side device, so that the terminal-side device processes the cognitive computing task based on the second neural network model.

In one embodiment, the terminal-side device requests, from the cloud-side device, the neural network model used to process the cognitive computing task, and after trimming the neural network model capable of processing the cognitive computing task, the cloud-side device delivers the trimmed neural network model to the terminal-side device, where a hardware resource required when the trimmed neural network model runs is within the available hardware resource capability range of the terminal-side device, so that a neural network model that originally runs on the cloud-side device with a strong computing capability can also be applicable to the terminal-side device with a relatively weak computing capability, and the terminal-side device can process the cognitive computing task. Therefore, the solution provided in this application can improve performance of processing a neural network-related application by the terminal-side device, and help enhance expansion of an intelligent application capability of the terminal-side device.

In one embodiment, the request message carries indication information used to indicate cognitive accuracy tolerance, and the cognitive accuracy tolerance represents expected accuracy of processing the cognitive computing task by the terminal-side device; and the trimming, by the cloud-side device, the first neural network model to obtain a second neural network model includes: trimming, by the cloud-side device based on the cognitive accuracy tolerance, the first neural network model to obtain the second neural network model, where accuracy of processing the cognitive computing task by using the second neural network model meets the cognitive accuracy tolerance.

In one embodiment, the cloud-side device trims, based on the cognitive accuracy tolerance of processing the cognitive computing task by the terminal-side device, the neural network model requested by the terminal-side device, and delivers the trimmed neural network model to the terminal-side device, so that the accuracy of processing the cognitive computing task by using the neural network model delivered to the terminal-side device meets the cognitive accuracy tolerance. Therefore, in the technical solution provided in this application, the terminal-side device can invoke, based on a hardware resource of the terminal-side device, the neural network model received from the cloud-side device, to process the cognitive computing task; in addition, accuracy of processing the cognitive computing task can be ensured, so that the performance of processing the neural network-related application by the terminal-side device can be further improved.

In one embodiment, accuracy of processing the cognitive computing task by using the second neural network model delivered by the cloud-side device to the terminal-side device is consistent with accuracy corresponding to the cognitive accuracy tolerance. In other words, the accuracy of processing the cognitive computing task by using the second neural network model is not much higher than the accuracy corresponding to the cognitive accuracy tolerance.

It should be understood that higher accuracy of processing the cognitive computing task by using the neural network model correspondingly indicates a larger computation amount and a larger storage capacity required. In this solution, hardware resources required for the neural network model are reduced to a relatively large extent on the premise that the accuracy of processing the cognitive computing task by using the neural network model delivered by the cloud-side device to the terminal-side device meets the cognitive accuracy tolerance, so as to reduce load of the hardware resources required when the neural network model runs on the terminal-side device.

In one embodiment, the trimming, by the cloud-side device, the first neural network model to obtain a second neural network model includes: trimming, by the cloud-side device, a parameter component of the first neural network model to obtain the second neural network model, where a required storage capacity of a parameter component of the second neural network model is less than a required storage capacity of the parameter component of the first neural network model.

In one embodiment, the cloud-side device may first train the first neural network model to obtain the parameter component (for example, a weight parameter component) of the first neural network model, and then trim the parameter component, for example, cluster weight parameter matrices of the first neural network model, so that a storage capacity required by a trimmed parameter component is less than a storage capacity required by the untrimmed parameter component. The second neural network model is formed after the parameter component of the first neural network model is trimmed. In other words, in this implementation, architecture components of the second neural network model and the first neural network model are the same, the parameter components of the second neural network model and the first neural network model are different, and the storage capacity required by the parameter component of the second neural network model is less than the storage capacity required by the parameter component of the first neural network model.

In one embodiment, in an implementation, a method for trimming the parameter component of the neural network model may include the following operations: Operation 1: Classify a row vector in the weight parameter matrix of the neural network model as a sub-vector, convert the sub-vector into a group of codewords (codeword) by using a sub-vector quantization method, and group codewords obtained by quantizing all sub-vectors to form a codebook (codebook). Operation 2: Cluster all weight parameters of the neural network model, and use a codeword to approximate all weight parameters of each type to form a codebook, where the codeword is a shared parameter for each type of weight parameters, that is, convert the weight parameter matrix into parameter-to-codebook location mapping and the codebook.

In this embodiment, the cloud-side device trims the parameter component of the neural network model, so as to reduce a storage capacity occupied by the neural network model, and reduce a computation amount and a required storage capacity of the neural network model in a running process, so that a hardware resource required when the neural network model (that is, the second neural network model) delivered to the terminal-side device runs is within the available hardware resource capability range of the terminal-side device.

In one embodiment, the trimming, by the cloud-side device, the first neural network model to obtain a second neural network model includes: trimming, by the cloud-side device, an architecture component of the first neural network model to obtain a third neural network model, where a computation amount of a computation kernel of the third neural network model is less than a computation amount of a computation kernel of the first neural network model; and trimming, by the cloud-side device, a parameter component of the third neural network model to obtain the second neural network model, where a required storage capacity of a parameter component of the second neural network model is less than a required storage capacity of the parameter component of the third neural network model.

In one embodiment, the cloud-side device first trims the architecture component of the first neural network model to obtain the third neural network model. It may be understood that the computation kernel of the third neural network model is simpler than the computation kernel of the first neural network model. Then the cloud-side device trains the third neural network model to obtain the parameter component of the third neural network model. Finally, the cloud-side device trims the parameter component of the third neural network model to obtain the second neural network model. The storage capacity required by the parameter component of the second neural network model is less than the storage capacity required by the parameter component of the third neural network model.

In one embodiment, in an implementation, a main method for trimming the architecture component of the neural network model includes any one or any combination of the following methods: reducing operand accuracy, reducing an order, and using a dedicated instruction of a hardware computing unit.

In this embodiment, the cloud-side device trims the architecture component of the neural network model, so as to simplify a computation kernel of the neural network model, thereby reducing a computation amount and a required storage capacity of the neural network model in a training process. The cloud-side device trims the parameter component of the neural network model, so as to reduce a storage capacity occupied by the neural network model, and reduce a computation amount and a required storage capacity of the neural network model in a running process, so that a hardware resource required when the neural network model (that is, the second neural network model) delivered to the terminal-side device runs is within the available hardware resource capability range of the terminal-side device.

In one embodiment, the request message carries indication information used to indicate an available hardware resource capability of the terminal-side device.

In this embodiment, the cloud-side device trims, based on the available hardware resource capability of the terminal-side device, the neural network model requested by the terminal-side device, and delivers the trimmed neural network model to the terminal-side device, so that a hardware resource required when the neural network model delivered to the terminal-side device runs is within the available hardware resource capability range of the terminal-side device, and the terminal-side device can invoke, based on a hardware resource of the terminal-side device, the neural network model received from the cloud-side device to process the cognitive computing task. Therefore, in this solution, performance of processing a neural network-related application by the terminal-side device can be improved.

In one embodiment, the request message further carries an identifier used to indicate the first neural network model; and the determining, by the cloud-side device based on the request message, a first neural network model used to process the cognitive computing task includes: determining, by the cloud-side device, the first neural network model based on the identifier.

In one embodiment, the request message further carries function information, and the function information is used to describe a function of processing the cognitive computing task; and the determining, by the cloud-side device based on the request message, a first neural network model used to process the cognitive computing task includes: determining, by the cloud-side device, the first neural network model based on the function information.

In one embodiment, a computation amount and a required storage capacity of the second neural network model are respectively less than a computation amount and a required storage capacity of the first neural network model.

According to a third aspect, a terminal-side device is provided, and the terminal-side device is configured to perform the method according to any one of the first aspect or the possible implementations of the first aspect. Specifically, the terminal-side device may include a module configured to perform the method according to any one of the first aspect or the possible implementations of the first aspect.

According to a fourth aspect, a cloud-side device is provided, and the cloud-side device is configured to perform the method according to any one of the second aspect or the possible implementations of the second aspect. Specifically, the cloud-side device may include a module configured to perform the method according to any one of the second aspect or the possible implementations of the second aspect.

According to a fifth aspect, a terminal-side device is provided, and the terminal-side device includes a memory and a processor. The memory is configured to store an instruction. The processor is configured to execute the instruction stored in the memory. In addition, execution of the instruction stored in the memory enables the processor to perform the method according to any one of the first aspect or the possible implementations of the first aspect.

According to a sixth aspect, a cloud-side device is provided, and the cloud-side device includes a memory and a processor. The memory is configured to store an instruction. The processor is configured to execute the instruction stored in the memory. In addition, execution of the instruction stored in the memory enables the processor to perform the method according to any one of the second aspect or the possible implementations of the second aspect.

According to a seventh aspect, a terminal-cloud collaboration system is provided, and the terminal-cloud collaboration system includes the terminal-side device provided in the third aspect and the cloud-side device provided in the fourth aspect.

In conclusion, in the embodiments provided in this application, the terminal-side device requests, from the cloud-side device, the neural network model used to process the cognitive computing task, and after trimming the neural network model capable of processing the cognitive computing task, the cloud-side device delivers the trimmed neural network model to the terminal-side device, where a hardware resource required when the trimmed neural network model runs is within the available hardware resource capability range of the terminal-side device, so that a neural network model that originally runs on the cloud-side device with a strong computing capability can also be applicable to the terminal-side device with a relatively weak computing capability, and the terminal-side device can process the cognitive computing task. Therefore, the solutions provided in this application can improve performance of processing a neural network-related application by the terminal-side device, and help enhance expansion of an intelligent application capability of the terminal-side device.

DESCRIPTION OF EMBODIMENTS

The following describes technical solutions of the embodiments in this application with reference to the accompanying drawings.

The embodiments of this application can be applied to scenarios of various intelligent terminal devices with weak computing capabilities, such as a driverless car, a robot, and intelligent terminal cognition.

In the embodiments of this application, a terminal-side device may also be referred to as user equipment (UE), a mobile station (MS), a mobile terminal, or the like. For example, the terminal-side device may be a mobile phone (or referred to as a "cellular" phone) or a computer with a mobile terminal, for example, may be a portable, pocket-sized, handheld, computer built-in, or in-vehicle mobile apparatus.

In the embodiments of this application, a cloud-side device may be a server or a server cluster, and the cloud-side device may also be referred to as a computing node or a cloud-side computing cluster.

A terminal-cloud collaboration system 100 provided in an embodiment of this application is first described below with reference to FIG. 1, so as to help understand and describe a method for data processing provided in an embodiment of this application.

Figure 1:
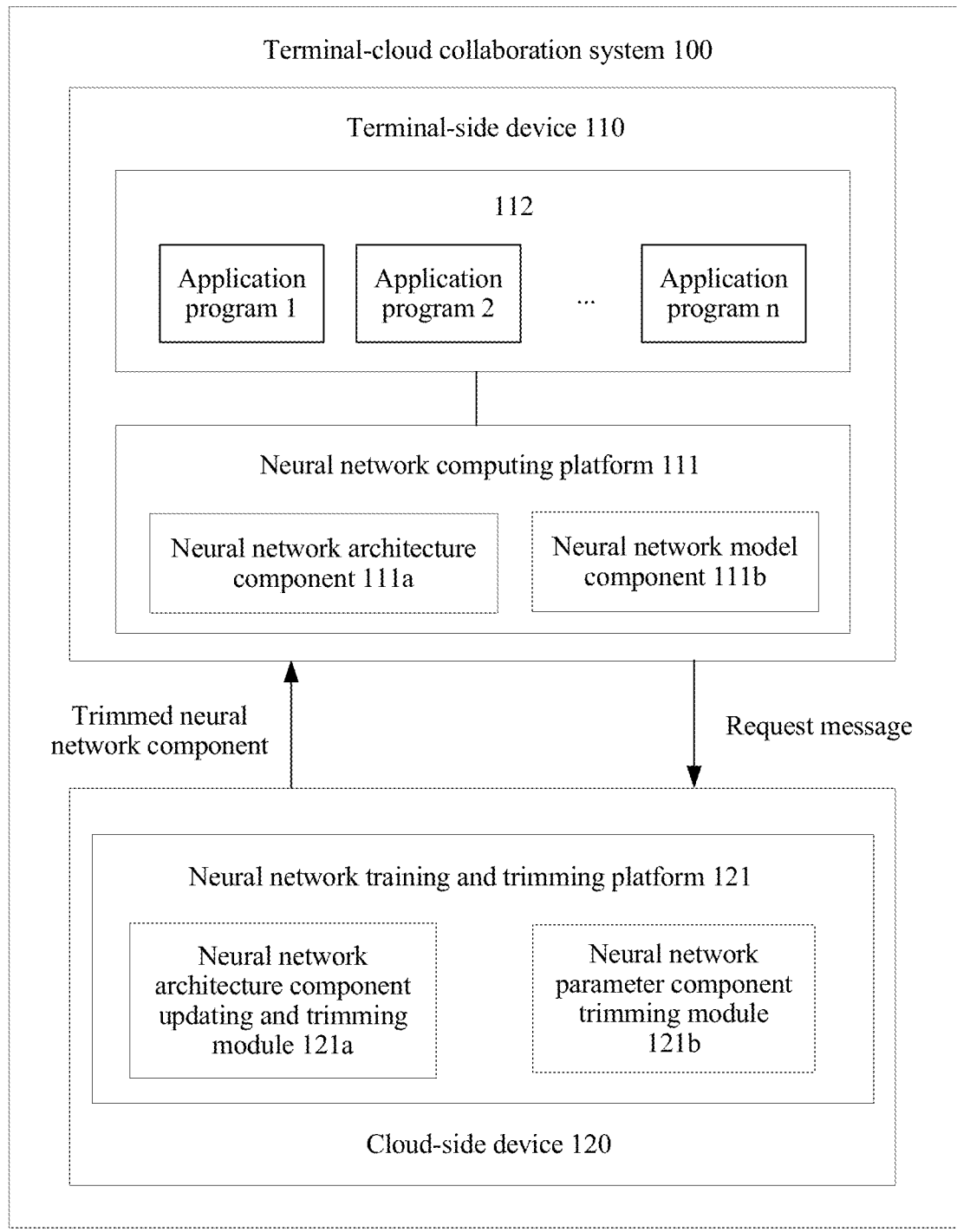
FIG. 1 is a schematic block diagram of a terminal-cloud collaboration system according to an embodiment of this application.

As shown in FIG. 1, the terminal-cloud collaboration system 100 includes a terminal-side device 110 and a cloud-side device 120. The terminal-side device 110 includes a neural network basic platform 111 and an application program 112 (FIG. 1 schematically shows application programs 1, 2, . . . , and n). The neural network basic platform 111 includes two decoupled components: a neural network architecture component 111a and a neural network parameter component 111b. The application program 112 is implemented through encapsulation based on the neural network basic platform 111 running on the terminal-side device 110, and the application program 120 is configured to provide a cognitive computing function for a user.

Both the neural network architecture component 111a and the neural network parameter component 111b may be updated and replaced. The neural network architecture component 111a is configured to support function expansion of the application program 120, for example, enhance an identification capability from identifying only a car to identifying a brand, a type, or the like of the car. The neural network parameter component 111b is configured to support updating of accuracy and performance of the application program 120, for example, obtain higher accuracy, obtain higher computing efficiency, or obtain lower energy consumption and a lower storage requirement during running of the application program.

In other words, the neural network architecture component 111a and the neural network parameter component 111b need to be updated to implement function expansion of the application program 120 on the terminal-side device 110. Only the neural network parameter component 111b may be updated if only the accuracy and performance of the application program 120 on the terminal-side device 110 need to be improved.

The terminal-side device 110 is configured to: receive a cognitive computing request, process the cognitive computing request by using the neural network basic platform 111 running on the terminal-side device 110, and return a processing result. The terminal-side device 110 is further configured to send a request message to the cloud-side device 120, so as to request to update the architecture component and/or the parameter component on the neural network basic platform.

The cloud-side device 120 includes a neural network training and trimming platform 121, and the neural network training and trimming platform 121 includes a neural network architecture component updating and trimming module 112a and a neural network parameter component trimming module 121b. The module 112a is configured to update and trim a neural network architecture running on the terminal-side device 110, and the model 112b is configured to trim a parameter obtained by training a neural network model.

The cloud-side device 120 is configured to: receive the request message from the terminal-side device 110, obtain, by using the neural network training and trimming platform 121, a neural network model required by the terminal-side device, and send a trimmed neural network component to the terminal-side device 110.

The neural network model refers to a program and data used to perform cognitive computing that are obtained by training a large amount of tagged data. The neural network model includes a neural network architecture component and a neural network parameter component. The neural network architecture component refers to a network related to a neural network algorithm and a hierarchical structure of the network that are in the neural network model, that is, the foregoing program in the neural network model that is used to perform cognitive computing. The neural network parameter component refers to a large quantity of parameters obtained when the neural network model is trained, and is used as a value of a neuron in a neural network architecture, that is, the foregoing data in the neural network model that is used to perform cognitive computing.

It should be noted that, in some embodiments, the following description may be given: The cloud-side device delivers a neural network model (for example, a second neural network model shown in FIG. 2) to the terminal-side device. The neural network model herein may include a neural network architecture component and a neural network parameter component, or the neural network model includes only a neural network parameter component.

Figure 2:
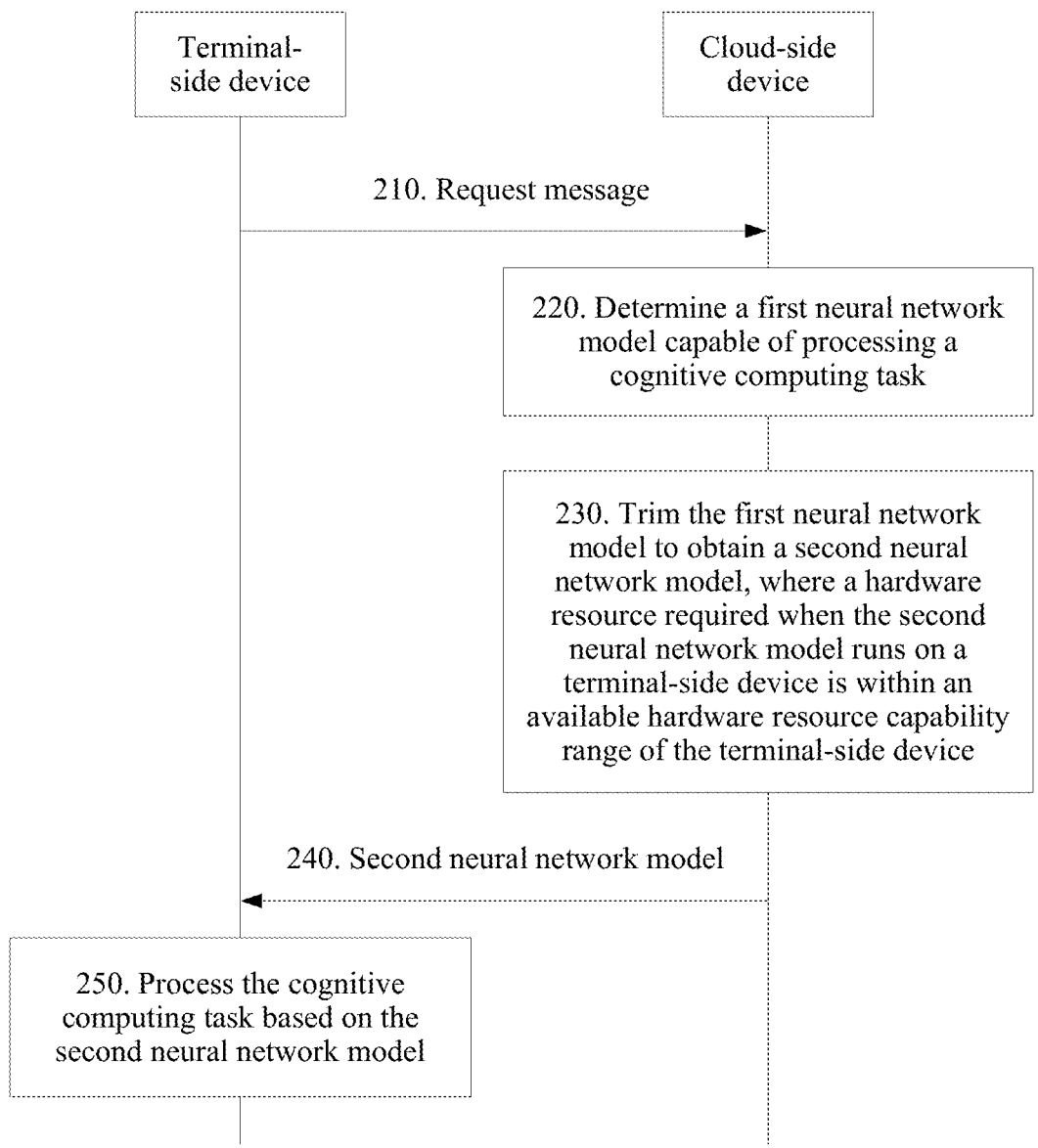
FIG. 2 is a schematic flowchart of a method for data processing according to an embodiment of this application.

FIG. 2 is a schematic flowchart of a method 200 for data processing according to an embodiment of this application. As shown in FIG. 2, the method 200 is performed by a terminal-side device and a cloud-side device. For example, the terminal-side device is the terminal-side device 110 shown in FIG. 1, and the cloud-side device is the cloud-side device 120 shown in FIG. 1. The method 200 includes the following operations.

Operation 210. The terminal-side device sends a request message to the cloud-side device, where the request message is used to request a neural network model used to process a cognitive computing task.

Specifically, the terminal-side device receives a cognitive computing request sent by a user, and the cognitive computing request is used to request to process the cognitive computing task.

Operation 220. The cloud-side device determines, based on the request message, a first neural network model used to process the cognitive computing task.

Specifically, the request message may carry information used to indicate the first neural network model.

Optionally, in some embodiments, the request message carries an identifier used to indicate the first neural network model. In operation 220, the cloud-side device determines the first neural network model based on the identifier.

For example, the cloud-side device may deliver in advance, to the terminal-side device, a correspondence between a cognitive computing function and an identifier of a neural network model with the cognitive computing function. The terminal-side device may directly report a corresponding identifier to the cloud-side device when the terminal-side device requires a neural network model with a cognitive computing function.

Optionally, in some embodiments, the request message carries function information, and the function information is used to describe a function of processing the cognitive computing task. In operation 220, the cloud-side device determines the first neural network model based on the function information. It should be understood that different neural network models are corresponding to different cognitive computing functions. The cloud-side device may obtain a neural network model with a corresponding cognitive computing function based on the function information.

Operation 230. The cloud-side device trims the first neural network model to obtain a second neural network model, where a hardware resource required when the second neural network model runs is within an available hardware resource capability range of the terminal-side device.

An available hardware resource capability of the terminal-side device is a computing capability and/or a storage capability of the terminal-side device. The computing capability is related to CPU performance of the terminal-side device, and the storage capability is related to storage performance of the terminal-side device.

In one embodiment, the cloud-side device may determine the available hardware resource capability range of the terminal-side device based on hardware resource information of the terminal-side device that is reported by the terminal-side device. For example, the hardware resource information may include CPU performance information and storage performance information of the terminal device.

It should be understood that the cloud-side device may further infer the available hardware resource capability of the terminal-side device based on an empirical value. This is not limited in this embodiment of this application.

The second neural network model in this embodiment of this application is obtained by trimming the first neural network model. Therefore, the second neural network model also has the function of processing the cognitive computing task.

Optionally, in some embodiments, a computation amount of the second neural network model is less than a computation amount of the first neural network model, and a required storage capacity of the second neural network model is less than a required storage capacity of the first neural network model. In this case, the second neural network model may be understood as a reduced model of the first neural network model.

A computation amount of a neural network model mentioned in this embodiment of this application refers to a data amount generated when the neural network model is used to process data, and a required storage capacity of the neural network model refers to storage space required for storing the neural network model.

Operation 240. The cloud-side device sends the second neural network model to the terminal-side device.

Operation 250. The terminal-side device processes the cognitive computing task based on the second neural network model.

In this embodiment of this application, the terminal-side device requests, from the cloud-side device, the neural network model used to process the cognitive computing task, and the cloud-side device sends a trimmed neural network model to the terminal-side device, where a hardware resource required when the trimmed neural network model runs is within the available hardware resource capability range of the terminal-side device, so that a neural network model that originally runs on the cloud-side device with a strong computing capability can also be applicable to the terminal-side device with a relatively weak computing capability, and the terminal-side device can process the cognitive computing task. Therefore, this embodiment of this application can improve performance of processing a neural network-related application by the terminal-side device, and help enhance expansion of an intelligent application capability of the terminal-side device.

Optionally, in an embodiment, in operation 250, the terminal-side device may directly process the cognitive computing task based on the second neural network model. For example, the second neural network model is a complete application program. The terminal-side device may directly process the corresponding cognitive computing task after downloading the second neural network model from the cloud-side device to the terminal-side device.

Optionally, in an embodiment, the terminal-side device includes a neural network basic platform (for example, the neural network basic platform 111 shown in FIG. 1), the neural network basic platform includes a neural network architecture component (for example, the neural network architecture component 111a shown in FIG. 1) and a neural network parameter component (for example, the neural network parameter component 111b shown in FIG. 1), and the neural network architecture component is decoupled from the neural network parameter component. In step 250, the terminal-side device updates the neural network basic platform based on the second neural network model, and then processes the cognitive computing task based on an updated neural network basic platform.

That the terminal-side device updates the neural network basic platform based on the second neural network model includes the following cases:

Case 1: The second neural network model includes only a corresponding parameter component; in this case, the terminal-side device updates only the neural network parameter component on the neural network basic platform based on the second neural network model, and an update to the neural network parameter component has no impact on the neural network architecture component on the neural network basic platform.

Case 2: The second neural network model includes a corresponding architecture parameter and parameter component; in this case, the terminal-side device updates both the neural network parameter component on the neural network basic platform and the neural network architecture component on the neural network basic platform based on the second neural network model, but updates to the neural network parameter component and the neural network architecture component are independent of each other and do not affect each other.

In this embodiment of this application, the neural network basic platform on the terminal-side device includes the neural network architecture component and the neural network parameter component, and the neural network architecture component is decoupled from the neural network parameter component. In other words, an update to the neural network parameter component and an update to the neural network architecture component are independent of each other and do not affect each other. This can help extend an intelligent application function of the terminal-side device.

It should be understood that, in the embodiment in which the terminal-side device includes the neural network basic platform, the request message sent by the terminal-side device to the cloud-side device may be referred to as a neural network component update request message.

Optionally, in some embodiments, the terminal-side device sends the request message to the cloud-side device under any one of the following trigger conditions:

Trigger condition 1: The terminal-side device lacks a neural network model (or an application program) used to process the cognitive computing task.

Trigger condition 2: The terminal-side device includes a neural network model (or an application program) capable of processing the cognitive computing task, but cognitive accuracy of the neural network model does not meet cognitive accuracy tolerance, where the cognitive accuracy tolerance represents expected accuracy of processing the cognitive computing task by the terminal-side device.

Trigger condition 3: The terminal-side device includes a neural network model (or an application program) capable of processing the cognitive computing task, but a hardware resource required when the neural network model runs exceeds an available hardware resource capability range of the terminal-side device.

In one embodiment, when the terminal-side device includes the neural network basic platform, if the terminal-side device sends the request message to the cloud-side device based on trigger condition 1, the request message is specifically used to request to update the neural network architecture component and the neural network parameter component on the neural network basic platform; if the terminal-side device sends the request message to the cloud-side device based on trigger condition 2, the request message is specifically used to request to update the neural network parameter component on the neural network basic platform; or if the terminal-side device sends the request message to the cloud-side device based on trigger condition 3, the request message is specifically used to request to update the neural network architecture component and the neural network parameter component on the neural network basic platform.

In this embodiment of this application, under any one of the foregoing conditions, the terminal-side device actively requests, from the cloud-side device, the neural network model used to process the cognitive computing task, so as to effectively achieve an objective that the terminal-side device has a function of processing a neural network-related application, and help enhance expansion of an intelligent application capability of the terminal-side device.

Optionally, in some embodiments, the request message sent by the terminal-side device to the cloud-side device carries indication information used to indicate the available hardware resource capability of the terminal-side device. Specifically, in step 230, the cloud-side device trims the first neural network model based on the available hardware resource capability of the terminal-side device, so as to obtain the second neural network model, where a hardware resource required when the second neural network model runs is within the available hardware resource capability range.

In one embodiment, the terminal-side device may determine the available hardware resource capability of the terminal-side device based on a change status of a hardware resource required when the neural network basic platform runs on the terminal-side device. Specifically, a computing capability $C_{CPU}$ and a storage capability $C_{MEM}$ required when the neural network basic platform runs on the terminal-side device are respectively measured based on the following formulas (1) and (2):

$$C_{CPU} = \frac{C_{CPU}(+NNC) - C_{CPU}(-NNC)}{C_{CPU}(-NNC)} \quad (1)$$

$$C_{MEM} = \frac{C_{MEM}(+NNC) - C_{MEM}(-NNC)}{C_{MEM}(-NNC)} \quad (2)$$

$C_{CPU}$ represents a current computing capability of the terminal-side device (for example, is represented by CPU usage of the terminal-side device), $C_{mem}$ represents a current storage capability of the terminal-side device (for example, is represented by memory usage of the terminal-side device), +NNC indicates that the neural network basic platform runs, and −NNC indicates that the neural network basic platform does not run.

In one embodiment, a plurality of different thresholds or change ranges may be set to measure a computing capability and a storage capability of the terminal-side device. When the computing capability or the storage capability reaches a threshold or falls within a change range, a state of the computing capability or the storage capability of the terminal-side device is entered, and then the state is used as a parameter of a trigger condition, and is used to indicate degrees of trimming a cloud-side neural network architecture and a cloud-side neural network model. As shown in Table 1, when trimming the neural network model, the cloud-side device selects a neural network model with suitable accuracy based on the computing capability and the storage capability of the terminal-side device.

TABLE 1

| Storage performance | Quantization | Computing performance | Dimension reduction |
| --- | --- | --- | --- |
| Strong | One time | Strong | One time |
| Moderate | Five times | Moderate | Five times |
| Weak | 10 times | Weak | 10 times |

In one embodiment of this application, the cloud-side device trims, based on the available hardware resource capability of the terminal-side device, the neural network model requested by the terminal-side device, and delivers the trimmed neural network model to the terminal-side device, so that the hardware resource required when the neural network model delivered to the terminal-side device runs is within the available hardware resource capability range of the terminal-side device, and the terminal-side device can invoke, based on a hardware resource of the terminal-side device, the neural network model received from the cloud-side device to process the cognitive computing task. Therefore, in this embodiment of this application, performance of processing a neural network-related application by the terminal-side device can be improved.

Optionally, in some embodiments, the request message sent by the terminal-side device to the cloud-side device carries indication information used to indicate cognitive accuracy tolerance, and the cognitive accuracy tolerance represents expected accuracy of processing the cognitive computing task by the terminal-side device. Specifically, in step 230, the cloud-side device trims, based on the cognitive accuracy tolerance, the first neural network model to obtain the second neural network model, so that accuracy of processing the cognitive computing task by using the second neural network model meets the cognitive accuracy tolerance.

In one embodiment, the terminal-side device collects and perceives accuracy that is of a cognitive computing result of the cognitive computing task and that is expected by an installed application program (APP), that is, cognitive computing tolerance, then adds the cognitive computing tolerance to the request message, and reports the request message to the cloud-side device, so that the cloud-side device delivers a neural network model that meets the cognitive computing tolerance to the terminal-side device.

The cognitive accuracy tolerance is related to an input data amount, a training time, a neural network model compression ratio that are involved in a process of training the neural network model by the cloud-side device. The cognitive accuracy tolerance may be defined as a continuous function of the input data amount, the training time, and the neural network model compression ratio: Cognitive accuracy tolerance=f(training time, model compression ratio, and input data amount). The training time may be represented by a quantity of times of iteration in the training process. The cognitive accuracy tolerance is inversely proportional to the training time; the cognitive accuracy tolerance is inversely proportional to the input data amount; and the cognitive accuracy tolerance is proportional to the model compression ratio. In other words, a larger input data amount or a longer training time indicates lower cognitive accuracy tolerance; and a larger model compression ratio indicates higher cognitive accuracy tolerance.

In one embodiment of this application, when requesting, from the cloud-side device, the neural network model used to process the cognitive computing task, the terminal-side device further reports the indication information used to indicate the cognitive accuracy tolerance, so that the neural network model delivered by the cloud-side device can meet a requirement for the cognitive accuracy tolerance. Therefore, in this embodiment of this application, the terminal-side device can invoke, based on a hardware resource of the terminal-side device, the neural network model received from the cloud-side device, to process the cognitive computing task; in addition, accuracy of processing the cognitive computing task can be ensured, so that the performance of processing the neural network-related application by the terminal-side device can be further improved.

It should be understood that higher accuracy of processing the cognitive computing task by using the neural network model correspondingly indicates a larger computation amount and a larger storage capacity required. In this embodiment of this application, accuracy of processing the cognitive computing task by using the second neural network model delivered by the cloud-side device to the terminal-side device is consistent with accuracy corresponding to the cognitive accuracy tolerance, so as to reduce a computation amount and a required storage capacity of the second neural network model to a relatively large extent. In other words, the accuracy of processing the cognitive computing task by using the second neural network model is not much higher than the accuracy corresponding to the cognitive accuracy tolerance.

For example, a pre-installed application program provided by a neural network cognitive computing platform for image classification is trained by using 1000 categories of ImageNet datasets by default; but only 20 of the 1000 categories need to be identified in an application scenario for the terminal-side device. In this case, because the default neural network cognitive computing platform provides an excessive quantity of functions, an architecture of a default neural network model integrated on the neural network cognitive computing platform is relatively complex, and a computation amount of the default neural network model is relatively large. Consequently, computing resources and storage resources of the terminal-side device are wasted when the neural network cognitive computing platform runs. In an actual use process, the terminal-side device determines a most frequently identified category, uses first 20 most frequently identified categories as parameters, adds these parameters to the request message, and sends the request message to the cloud-side device. The cloud-side device trims a neural network architecture component based on an accuracy requirement of the terminal-side device, trims a neural network parameter component obtained through training, and sends a corresponding neural network component to the terminal-side device after completing trimming. This can effectively avoid wasting the computing resources and the storage resources of the terminal-side device.

Therefore, in one embodiment of this application, hardware resources required for the second neural network model are reduced to a relatively large extent on the premise that the accuracy of processing the cognitive computing task by using the second neural network model meets the cognitive accuracy tolerance of the terminal-side device, so as to reduce load of the hardware resources required when the neural network model runs on the terminal-side device.

It should be understood that, in the foregoing embodiment in which image classification is used as an example, if there is a new requirement for an application scenario after the terminal-side device reduces a quantity of categories for the neural network cognitive computing platform to 20, for example, a quantity of to-be-identified categories is increased to 21, the terminal-side device re-submits a perceived accuracy requirement to the cloud-side device, to trigger trimming and training of a neural network architecture and parameter of the cloud-side device and a real-time update to the terminal-side device.

To help a person skilled in the art better understand this embodiment of this application, a specific method in which the cloud-side device trims the first neural network model to obtain the second neural network model is described below with reference to FIG. 3 to FIG. 7.

Optionally, in an embodiment, operation 230 in which the cloud-side device trims the first neural network model to obtain a second neural network model includes: trimming, by the cloud-side device, a parameter component of the first neural network model to obtain the second neural network model, where a required storage capacity of a parameter component of the second neural network model is less than a required storage capacity of the parameter component of the first neural network model.

In one embodiment, the cloud-side device first trains the first neural network model to obtain the parameter component (for example, a weight parameter component) of the first neural network model, and then trims the parameter component, for example, clusters weight parameter matrices of the first neural network model, so that a storage capacity required by a trimmed parameter component is less than a storage capacity required by the untrimmed parameter component. The second neural network model is formed after the parameter component of the first neural network model is trimmed. In other words, in this implementation, architecture components of the second neural network model and the first neural network model are the same, the parameter components of the second neural network model and the first neural network model are different, and the storage capacity required by the parameter component of the second neural network model is less than the storage capacity required by the parameter component of the first neural network model.

In one embodiment of this application, an operation of trimming a parameter component of a neural network model is for a neural network model obtained after training is completed. It should be understood that a process of training the neural network model is a process of obtaining the parameter component of the neural network model. Therefore, trimming the parameter component of the neural network model may be mainly trimming a weight parameter matrix of the neural network model. A purpose of trimming the parameter component of the neural network model is to reduce a storage capacity occupied by the neural network model, and to reduce a computation amount and a required storage capacity of the neural network model in a running process.

In one embodiment, a method for trimming the parameter component of the neural network model may include the following operations: Operation 1: Classify a row vector in the weight parameter matrix of the neural network model as a sub-vector, convert the sub-vector into a group of codewords (codeword) by using a sub-vector quantization method, and group codewords obtained by quantizing all sub-vectors to form a codebook (codebook). Operation 2: Cluster all weight parameters of the neural network model, and use a codeword to approximate all weight parameters of each type to form a codebook, where the codeword is a shared parameter for each type of weight parameters, that is, convert the weight parameter matrix into parameter-to-codebook location mapping and the codebook.

Figure 3:
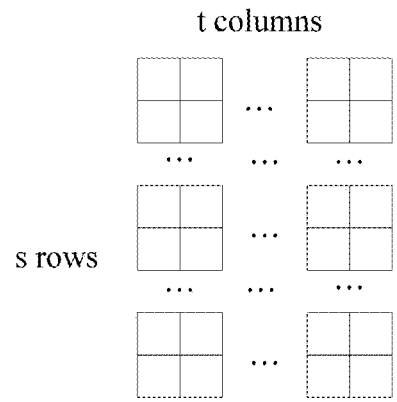
FIG. 3 to FIG. 6 are schematic diagrams of trimming a neural network parameter component according to an embodiment of this application.
Figure 4:
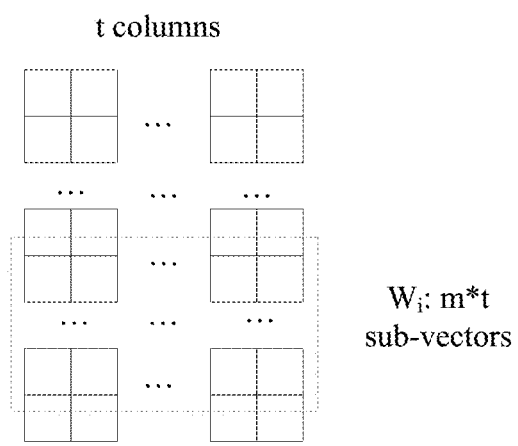
Figure 5:
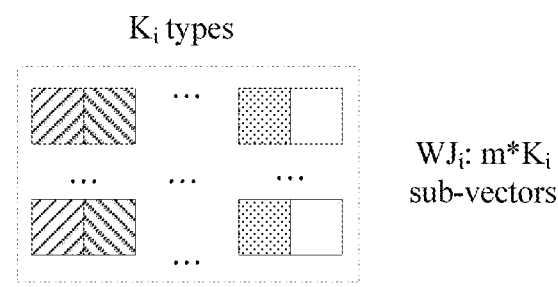
Figure 6:
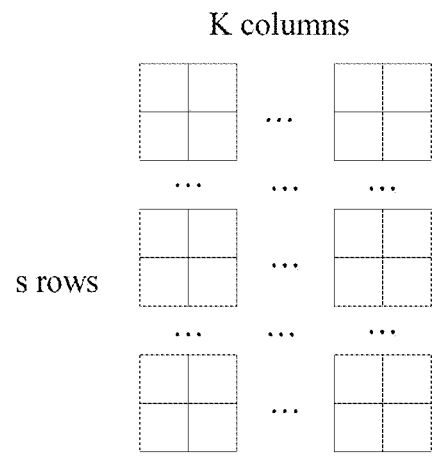

In one embodiment, FIG. 3 to FIG. 6 are schematic diagrams of operations of trimming the parameter component of the neural network model. As shown in FIG. 3, it is assumed that a weight parameter matrix obtained by training the neural network model is an s*t weight parameter matrix shown in FIG. 3. FIG. 4 is a schematic diagram of classifying row vectors in the weight parameter matrix shown in FIG. 3 as sub-vectors. Specifically, the s*t weight parameter matrix shown in FIG. 3 is decomposed into s/m m*t sub-vectors by using a row vector as a unit, and each sub-vector $W_i$ includes m rows. FIG. 5 is a schematic diagram of clustering all weight parameters. Specifically, all sub-vectors $W_i$ obtained in the operation shown in FIG. 4 are clustered in a manner of K-means or the like, and are classified into $K_i$ types based on similarity of values to obtain m*$K_i$ sub-vectors, that is, $WJ_i$. Each sub-vector has $K_i$ column vectors in total, and a value of each column vector is an approximate value of all column vectors of a same type, for example, an intermediate value of all the column vectors. FIG. 6 is a schematic diagram of a result obtained after the weight parameter matrix W: s*t shown in FIG. 3 is processed in the operations shown in FIG. 4 and FIG. 5. In one embodiment, the weight parameter matrix W: s*t is converted into a weight parameter approximation matrix WJ: s*K.

In one embodiment of this application, the cloud-side device trims the parameter component of the neural network model, so as to reduce a storage capacity occupied by the neural network model, and reduce a computation amount and a required storage capacity of the neural network model in a running process, so that a hardware resource required when the neural network model (that is, the second neural network model) delivered to the terminal-side device runs is within the available hardware resource capability range of the terminal-side device.

It may be learned from the foregoing description that the parameter component of the neural network model may be trimmed to effectively reduce the computation amount and the required storage capacity of the neural network model. An architecture component of the neural network model may be further trimmed before the neural network model is trained, so as to further reduce the computation amount and the required storage capacity of the neural network model.

Optionally, in an embodiment, operation 230 in which the cloud-side device trims the first neural network model to obtain a second neural network model includes: trimming, by the cloud-side device, an architecture component of the first neural network model to obtain a third neural network model, where a computation amount of a computation kernel of the third neural network model is less than a computation amount of a computation kernel of the first neural network model; and trimming, by the cloud-side device, a parameter component of the third neural network model to obtain the second neural network model, where a required storage capacity of a parameter component of the second neural network model is less than a required storage capacity of the parameter component of the third neural network model.

In one embodiment, the cloud-side device first trims the architecture component of the first neural network model to obtain the third neural network model. The computation amount of the computation kernel of the third neural network model is less than the computation amount of the computation kernel of the first neural network model. In other words, the computation kernel of the third neural network model is simpler than the computation kernel of the first neural network model. Then the cloud-side device trains the third neural network model to obtain the parameter component of the third neural network model. Finally, the cloud-side device trims the parameter component of the third neural network model to obtain the second neural network model. The storage capacity required by the parameter component of the second neural network model is less than the storage capacity required by the parameter component of the third neural network model.

In this embodiment of this application, the architecture component of the neural network model is trimmed to simplify a computation kernel of the neural network model, and the architecture component is trimmed to reduce a computation amount and a required storage capacity of the neural network model in a training process.

In one embodiment, a method for trimming the architecture component of the neural network model includes any one or any combination of the following methods: reducing operand accuracy, reducing an order, and using a dedicated instruction of a hardware computing unit. A manner of reducing an order includes convolution kernel decomposition, matrix decomposition, or the like. The dedicated instruction of a hardware computing unit includes, for example, a single-instruction multiple-data stream (Single Instruction Multiple Data, SIMD) instruction, a streaming single-instruction multiple-data expansions 2 (Streaming SIMD Expansions 2, SSE2) instruction, a streaming single-instruction multiple-data expansions 3 (Streaming SIMD Expansions 3, SSE3) instruction, or a supplemental streaming single-instruction multiple-data expansions 3 (Supplemental Streaming SIMD Expansions 3, SSSE3) instruction.

Figure 7:
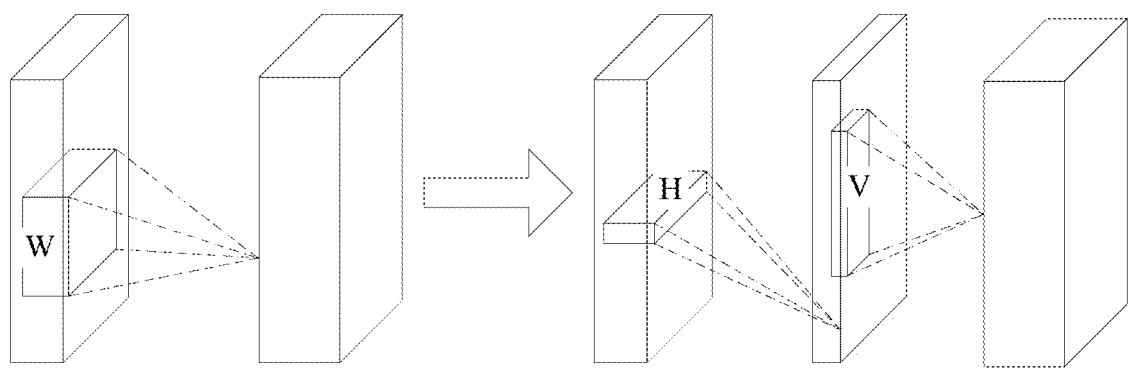
FIG. 7 is a schematic diagram of trimming a neural network architecture component according to an embodiment of this application.

The reducing an order is used as an example. An operation of a high-order vector is converted into a product operation of two low-order vectors. An operation of reducing an order of the high-order vector includes a plurality of mathematical methods. For example, Tucker decomposition may be performed to convert the high-order vector into a product of a plurality of low-order vectors. For example, in a convolutional neural network, a 4D convolution kernel tensor W is decomposed into an accumulated sum of products of K horizontal filters (Horizontal Filter) $H^k$ and K vertical filters (Vertical Filter) $V_k$, that is, $$W = \sum_{k=1}^{K} H^k (V_k)^T,$$

and K is a parameter used to control an order (Rank). Specifically, as shown in FIG. 7, a high-order vector W to be learned in a process of training the neural network model is converted into two low-order vectors H and V.

In one embodiment, for a detailed method for trimming the parameter component of the third neural network model, refer to the foregoing related description, for example, the description with reference to FIG. 3. For brevity, details are not described herein again.

In one embodiment of this application, the cloud-side device trims the architecture component of the neural network model, so as to simplify the computation kernel of the neural network model, thereby reducing the computation amount and the required storage capacity of the neural network model in a training process. The cloud-side device trims the parameter component of the neural network model, so as to reduce the storage capacity occupied by the neural network model, and reduce the computation amount and the required storage capacity of the neural network model in a running process, so that a hardware resource required when the neural network model (that is, the second neural network model) delivered to the terminal-side device runs is within the available hardware resource capability range of the terminal-side device.

It should be understood that a same cognitive computing task may correspond to different accuracy requirements in different application fields. In other words, the terminal-side device may correspond to different degrees of cognitive computing tolerance when processing a same cognitive computing task in different application fields. The following two solutions are proposed in this embodiment of this application, so that the terminal-side device can respond to different accuracy requirements in different application fields when processing a same cognitive computing task.

In a first embodiment, the cloud-side device obtains, based on the request message, a neural network architecture capable of processing the cognitive computing task; trains the neural network architecture to obtain a plurality of neural network models with different degrees of cognitive accuracy; and delivers the plurality of neural network models with different degrees of cognitive accuracy to the terminal-side device. In other words, the plurality of neural network models with different degrees of cognitive accuracy are pre-stored on the terminal-side device. For example, when the terminal-side device needs to process the cognitive computing task in an application scenario A, the terminal-side device selects a neural network model with cognitive accuracy corresponding to the application scenario A to process the cognitive computing task; when the terminal-side device needs to process the cognitive computing task in an application scenario B, the terminal-side device selects a neural network model with cognitive accuracy corresponding to the application scenario B to process the cognitive computing task.

It should be understood that, in the first solution, the neural network models with different degrees of cognitive accuracy are pre-stored on the terminal-side device, so that efficiency of processing the cognitive computing task in different application scenarios by the terminal-side device can be effectively improved.

In a second embodiment, the terminal-side device determines, based on a to-be-processed application scenario, a requirement of the application scenario for cognitive accuracy, that is, cognitive accuracy tolerance, and then adds the cognitive accuracy tolerance to the request message; and the cloud-side device obtains, based on the cognitive accuracy tolerance, a neural network model that meets the cognitive accuracy tolerance, and then delivers the neural network model to the terminal-side device. In other words, the cloud-side device delivers, to the terminal-side device, only a neural network model that meets current cognitive accuracy tolerance of the terminal-side device.

Therefore, in the second embodiment, the cloud-side device delivers, to the terminal-side device, only a neural network model that meets cognitive accuracy in a current application scenario, so that storage load of the terminal-side device can be reduced.

Figure 8:
FIG. 8 is a schematic diagram of a to-be-identified image according to an embodiment of this application.
Figure 9:
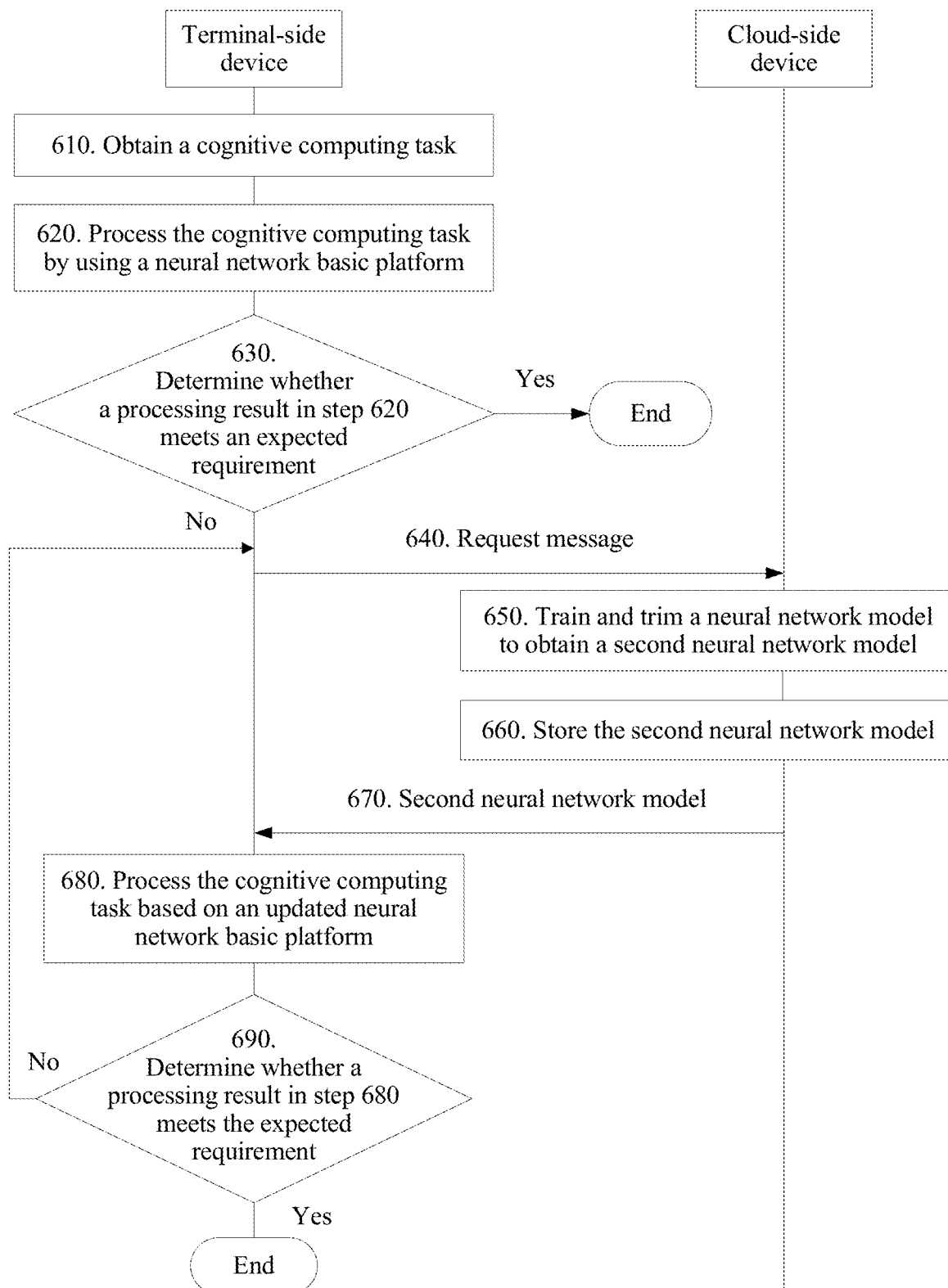
FIG. 9 is another schematic flowchart of a method for data processing according to an embodiment of this application.

To better understand the method for data processing in this embodiment of this application, the following describes the method for data processing in this embodiment of this application with reference to FIG. 9 by using a cognitive computing scenario shown in FIG. 8 as an example.

It is assumed that a cognitive computing task to be processed by the terminal-side device is to identify an object in a picture shown in FIG. 8, and the object in the figure is a Mercedes-Benz SUV. The terminal-side device obtains the picture shown in FIG. 8, and uses the picture as input data of a cognitive application program (corresponding to a neural network basic platform) on the terminal-side device. The cognitive application program obtains an identification result by processing the input data, for example, a coarse-grained correct identification result is a "car". It should be understood that the cognitive application program mentioned herein is implemented through encapsulation based on the neural network basic platform running on the terminal-side device, and a function of the cognitive application program is to provide a cognitive function for a user. In this embodiment, the function is used to identify the object in the picture shown in FIG. 8.

As shown in FIG. 9, a specific processing procedure is as follows:

Operation 610. The terminal-side device obtains a to-be-processed cognitive computing task, that is, to identify a car in the picture shown in FIG. 8.

Operation 620. The terminal-side device processes the cognitive computing task by using a cognitive application program; in other words, the terminal-side device processes the cognitive computing task by using a neural network basic platform running on the terminal-side device.

Operation 630. Determine whether a processing result in operation 620 meets an expected requirement; and if the processing result in operation 620 meets the expected requirement, end the procedure, or if the processing result in operation 620 does not meet the expected requirement, perform operation 640.

In one embodiment, that the processing result in operation 620 does not meet the expected requirement includes the following three cases:

In a first case, an identification result of the cognitive application program on the terminal-side device does not meet the expected requirement. For example, if the object in the picture shown in FIG. 8 is identified as a "ship", the identification result is incorrect.

In a second case, an identification function of the cognitive application program on the terminal-side device does not meet the expected requirement. For example, the cognitive application program on the terminal-side device can only identify the object in the picture shown in FIG. 8 as a "car", but cannot identify the object in the picture shown in FIG. 8 as "Mercedes-Benz".

In a third case, a hardware resource required when the cognitive application program on the terminal-side device that is capable of identifying the object in the picture shown in FIG. 8 runs exceeds an available hardware resource capability range of the terminal-side device.

Operation 640. If the processing result in operation 620 does not meet the expected requirement, the terminal-side device sends a request message to the cloud-side device, so as to trigger the cloud-side device to train and trim a neural network of the terminal-side device.

In one embodiment, the terminal-side device may upload an obtained new picture set, that is, an incremental picture set, to the cloud-side device, so that the cloud-side device trains and trims the neural network of the terminal-side device based on an existing picture set and the newly uploaded incremental picture set.

Operation 650. The cloud-side device trains and trims a neural network model to obtain a second neural network model.

In one embodiment, the cloud-side device obtains, based on the request message, a first neural network model capable of processing the cognitive computing task, and then trims the first neural network model to obtain the second neural network model. A computation amount and a required storage capacity of the second neural network model are respectively less than a computation amount and a required storage capacity of the first neural network model.

The trimming the first neural network model to obtain the second neural network model includes: trimming a parameter component of the first neural network model to obtain the second neural network model.

Alternatively, the trimming the first neural network model to obtain the second neural network model includes:

trimming an architecture component of the first neural network model to obtain a third neural network model, where a computation amount of a computation kernel of the third neural network model is less than a computation amount of a computation kernel of the first neural network model; and trimming a parameter component of the third neural network model to obtain the second neural network model.

For specific descriptions, refer to the foregoing related description. For brevity, details are not described herein again.

Operation 660. The cloud-side device stores the second neural network model.

Operation 670. The cloud-side device delivers the second neural network model to the terminal-side device.

In one embodiment, operation 670 may also be: The cloud-side device pushes the neural network model to the terminal-side device.

It should be understood that the neural network model delivered by the cloud-side device to the terminal-side device may include a neural network architecture component and a neural network parameter component, or may include only a neural network parameter component.

Operation 680. The terminal-side device updates, based on the second neural network model received from the cloud-side device, the neural network basic platform running on the terminal-side device, and processes the cognitive computing task based on an updated neural network basic platform.

Operation 690. The terminal-side device determines whether a processing result in operation 680 meets the expected requirement; and if the processing result in operation 680 meets the expected requirement, ends the procedure, or if the processing result in operation 680 does not meet the expected requirement, performs operation 640.

Therefore, in one embodiment of this application, the terminal-side device requests, from the cloud-side device, the neural network model used to process the cognitive computing task, and after trimming the neural network model capable of processing the cognitive computing task, the cloud-side device delivers the trimmed neural network model to the terminal-side device, where a hardware resource required when the trimmed neural network model runs is within the available hardware resource capability range of the terminal-side device, so that a neural network model that originally runs on the cloud-side device with a strong computing capability can also be applicable to the terminal-side device with a relatively weak computing capability, and the terminal-side device can process the cognitive computing task. Therefore, this embodiment of this application can improve performance of processing a neural network-related application by the terminal-side device, and help enhance expansion of an intelligent application capability of the terminal-side device.

In one embodiment, in operation 660 in the embodiment shown in FIG. 9, storage of the neural network model on the cloud-side device may be implemented by using a content delivery network (Context Delivery Network, CDN). In operation 670, dynamic update push of the neural network model to the terminal-side device may be implemented by using a push notification server (Push Notification Server, PNS), and delivery of the neural network model to the terminal-side device may be implemented by using the content delivery network (CDN).

Figure 10:
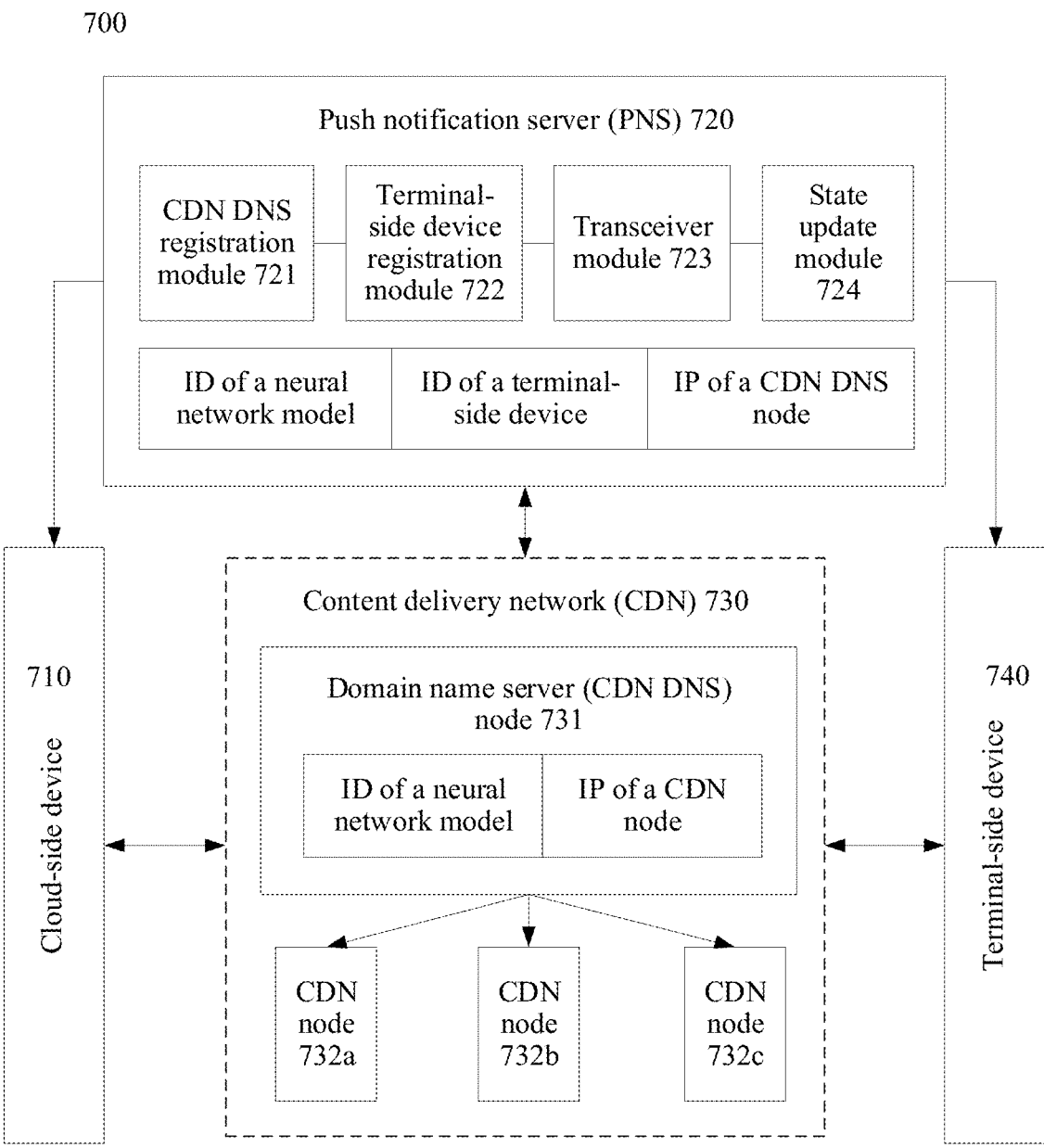
FIG. 10 is another schematic block diagram of a terminal-cloud collaboration system according to an embodiment of this application.

Specifically, as shown in FIG. 10, an embodiment of this application further provides a terminal-cloud collaboration system 700. The terminal-cloud collaboration system 700 includes a cloud-side device 710, a push notification server (PNS) 720, a content delivery network (CDN) 730, and a terminal-side device 740. The cloud-side device 710, the push notification server 720, the content delivery network 730, and the terminal-side device 740 may communicate with each other.

As shown in FIG. 10, the content delivery network (CDN) 730 includes an intelligent scheduling domain name server (e.g., Context Delivery Network Domain Name System, CDN DNS) node 731 and a plurality of CDN nodes 732 (FIG. 10 schematically shows three CDN nodes 732). The CDN node 732 is configured to store a neural network model obtained by the cloud-side device. The CDN DNS node 731 is configured to maintain a correspondence between a neural network model stored in a network and a CDN node 732. Specifically, in an example of FIG. 10, the CDN DNS node 731 maintains a correspondence between an identifier of a neural network model (Model ID) and an IP address of a CDN node 732 (CDN Node IP). Optionally, an identifier of one neural network model may correspond to IP addresses of a plurality of CDN nodes.

As shown in FIG. 10, the push notification server 720 includes a CDN DNS node registration module 721, a terminal-side device registration module 722, a transceiver module 723, and a state update module 724. The push notification server 720 further maintains a correspondence between an identifier of a neural network model (Model ID), an identifier of the terminal-side device (Device ID), and an IP address of the CDN DNS node (CDN DNS IP). The push notification server 720 may further maintain a state machine of the terminal-side device 740, that is, maintain a state update of the terminal-side device 740. A data structure used by the push notification server 720 to maintain the foregoing information may be a two-dimensional table.

A processing procedure of implementing storage of the neural network model on the cloud-side device by using the content delivery network (CDN) is as follows:

Step 1: When the CDN DNS node 731 communicates with the push notification server 720 for the first time, the CDN DNS node 731 first needs to send, to the push notification server 720, a registration request for requesting to register the CDN DNS node 731, where the registration request includes an IP address of the CDN DNS node 731; and after the push notification server 720 receives the registration request, the CDN DNS registration module 721 processes the registration request, and stores the IP address of the CDN DNS node 731 on the push notification server 720.

Step 2: After completing training and trimming of a neural network model, the cloud-side device 710 sends a storage request to the CDN DNS node 731 to request to store the neural network model; the CDN DNS node 731 allocates a CDN node configured to store the neural network model (a neural network architecture component and/or a neural network parameter component), for example, a CDN node 732a shown in FIG. 10, and sends, to the cloud-side device 710, a response message used to indicate the CDN node 732a that stores the neural network model; and the CDN DNS node 731 is further configured to maintain a correspondence between an identifier of the neural network model and an IP address of the selected CDN node 732. Specifically, a data structure for maintaining the correspondence may be a two-dimensional table shown in FIG. 10.

Step 3: The cloud-side device stores, based on the received response message, the neural network model obtained after training and trimming on the corresponding CDN node, for example, on the CDN node 732a.

In one embodiment, a log may be maintained on the cloud-side device 710. Each log entry includes an identifier of a neural network model, an available version number of the neural network model, accuracy/precision corresponding to the version, completion time of the version, and the like. It should be understood that the log maintained on the cloud-side device 710 helps implement update push of the neural network model.

In one embodiment, the cloud-side device 710 adds a new log entry to the log after completing training and trimming of the neural network model. The cloud-side device 710 sends the new log entry to the push notification server 720, so as to trigger the push notification server 720 to send an update push notification to the terminal-side device 740. The terminal-side device 740 may choose, based on information about a current neural network model available to the cloud-side device 710, whether to update a neural network model on the terminal-side device 740.

Figure 11:
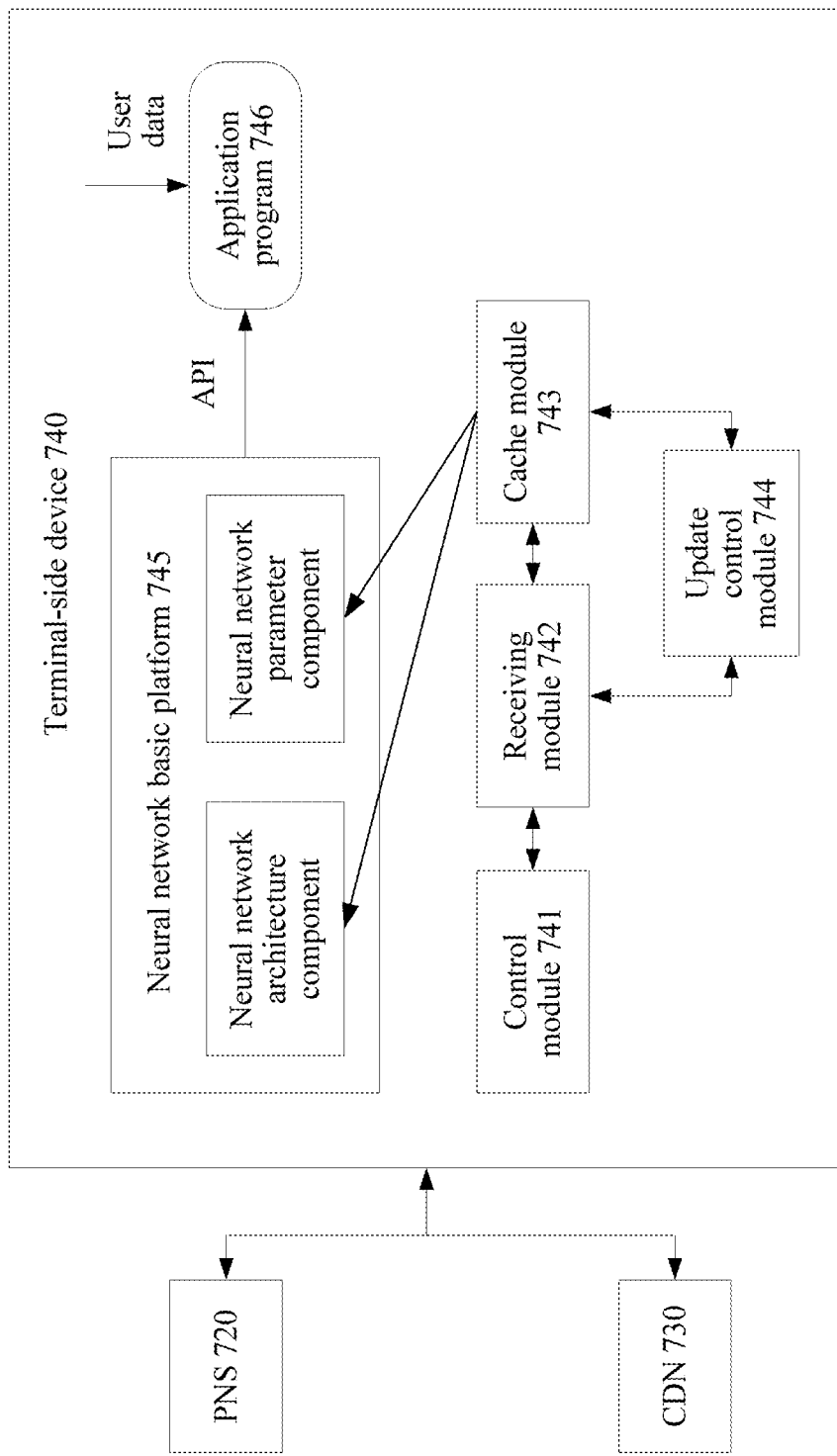
FIG. 11 is still another schematic block diagram of a terminal-cloud collaboration system according to an embodiment of this application.

As shown in FIG. 11, the terminal-side device 740 includes a control module 741, a receiving module 742, a cache module 743, an update control module 744, a neural network basic platform 745, and an application program 745. The neural network basic platform 745 includes a neural network architecture component and a neural network parameter component, and the neural network architecture component is decoupled from the neural network parameter component. In other words, both a submodule in the neural network architecture component and a submodule in the neural network parameter component may be replaced based on a requirement. The application program 745 is an APP obtained through encapsulation based on the neural network basic platform 745.

A procedure of dynamically updating the neural network model (a component) on the terminal-side device 740 is as follows:

Step 1: After the cloud-side device 710 has a new available version of a neural network model, the push notification server 720 sends an update push notification to a corresponding terminal-side device (for example, the terminal-side device 740) based on the correspondence between an ID of a neural network model and an ID of the terminal-side device that is maintained on the push notification server 720.

Step 2: The control module 741 of the terminal-side device 740 receives the update push notification from the push notification server 720, and feeds back, to the push notification server 720, a signal indicating whether the terminal-side device 740 locally updates the neural network model; and the push notification server 720 modifies an update state in a two-dimensional table of the push notification server 720 based on the feedback.

Step 3: If the terminal-side device 740 chooses to update the local neural network model (a component) after receiving the update push notification from the push notification server 720, the terminal-side device 740 sends a neural network update request to the content delivery network (CDN) 730.

Step 4: The CDN DNS node 731 obtains, based on the neural network update request of the terminal-side device 740, an identifier of a neural network model requested by the terminal-side device 740; and then determines, based on the correspondence between an identifier of a neural network model and an IP address of a CDN node that is on the CDN DNS node 731, an IP address of a CDN node (for example, the CDN node 732a) that actually stores the neural network model requested by the terminal-side device 740, and sends the IP address of the CDN node 732a to the terminal-side device 740.

Step 5: The control module 741 of the terminal-side device 740 sends a neural network model request message to the CDN node 732a based on the IP address of the CDN node 732a that is sent by the CDN DNS node 731, and the control module 741 further controls the receiving module 742 to receive information fed back by the CDN node 732a.

Step 6: The CDN node 732a sends the corresponding neural network model to the terminal-side device 740, and specifically, may send an architecture component and/or a parameter component that are/is of the neural network model.

Step 7: The receiving module 742 receives the neural network model sent by the CDN node 732a, and caches the neural network model by using the cache model 734.

Step 8: The update control module 744 is configured to update a related component on the neural network basic platform 745 based on the neural network model cached by the cache model 734, for example, update a neural network architecture component on the neural network basic platform 745 based on the architecture component of the neural network model cached by the cache model 734, and update a neural network parameter component on the neural network basic platform 745 based on the parameter component of the neural network model cached by the cache model 734.

As shown in FIG. 11, a new function (that is, a function corresponding to the neural network model delivered by the cloud-side device) is added to the application program 746 based on the updated neural network basic platform 745 by using an application programming interface (Application Programming Interface, API), so that the application program 746 can process user data. The user data is data in an intelligent application scenario, and the intelligent application scenario includes, for example, a driverless car, a robot, and intelligent terminal cognition.

The method for data processing in this embodiment of this application is described above. A terminal-side device, a cloud-side device, and a terminal-cloud collaboration system in the embodiments of this application are described below with reference to FIG. 12 to FIG. 16.

Figure 12:
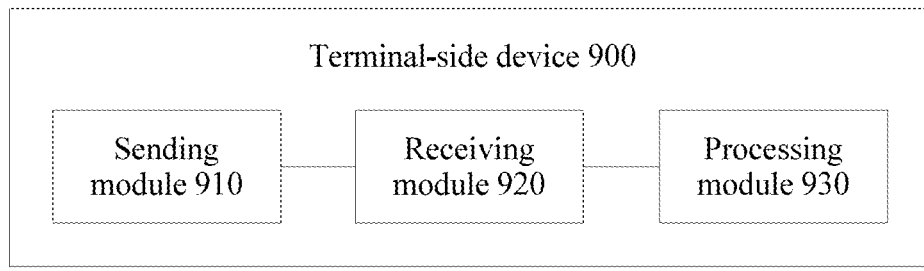
FIG. 12 is a schematic block diagram of a terminal-side device according to an embodiment of this application.

FIG. 12 is a schematic block diagram of a terminal-side device 900 according to an embodiment of this application. The terminal-side device 900 includes:

a sending module 910, configured to send a request message to a cloud-side device, where the request message is used to request a neural network model used to process a cognitive computing task;

a receiving module 920, configured to receive a second neural network model that is obtained by trimming a first neural network model and that is sent by the cloud-side device, where the first neural network model is a neural network model on the cloud-side device that is used to process the cognitive computing task, and a hardware resource required when the second neural network model runs is within an available hardware resource capability range of the terminal-side device; and a processing module 930, configured to process the cognitive computing task based on the second neural network model.

In one embodiment of this application, the terminal-side device requests, from the cloud-side device, the neural network model used to process the cognitive computing task, and after trimming the neural network model capable of processing the cognitive computing task, the cloud-side device delivers the trimmed neural network model to the terminal-side device, where a hardware resource required when the trimmed neural network model runs is within the available hardware resource capability range of the terminal-side device, so that a neural network model that originally runs on the cloud-side device with a strong computing capability can also be applicable to the terminal-side device with a relatively weak computing capability, and the terminal-side device can process the cognitive computing task. Therefore, this embodiment of this application can improve performance of processing a neural network-related application by the terminal-side device, and help enhance expansion of an intelligent application capability of the terminal-side device.

Optionally, in an embodiment, the terminal-side device includes a neural network basic platform, the neural network basic platform includes a neural network architecture component and a neural network parameter component, and the neural network architecture component is decoupled from the neural network parameter component. The processing module 930 is specifically configured to: when the second neural network model includes an architecture update component, update the neural network architecture component based on the architecture update component; when the second neural network model includes a parameter update component, update the neural network parameter component based on the parameter update component; and process the cognitive computing task based on an updated neural network basic platform.

Optionally, in an embodiment, the sending module 910 is configured to send the request message to the cloud-side device under any one of the following conditions: the terminal-side device lacks a neural network model used to process the cognitive computing task; accuracy of processing the cognitive computing task by using a neural network model on the terminal-side device does not meet cognitive accuracy tolerance; and a hardware resource required when a neural network model on the terminal-side device that is used to process the cognitive computing task runs exceeds an available hardware resource capability of the terminal-side device, where the cognitive accuracy tolerance represents expected accuracy of processing the cognitive computing task by the terminal-side device.

Optionally, in an embodiment, the request message carries indication information used to indicate the cognitive accuracy tolerance, so that the cloud-side device trims the first neural network model to obtain the second neural network model that meets the cognitive accuracy tolerance, where the cognitive accuracy tolerance represents the expected accuracy of processing the cognitive computing task by the terminal-side device.

Optionally, in an embodiment, the request message carries indication information used to indicate the available hardware resource capability of the terminal-side device.

Optionally, in an embodiment, the request message further carries an identifier used to indicate the first neural network model, so that the cloud-side device determines the first neural network model based on the identifier; or the request message further carries function information, and the function information is used to describe a function of processing the cognitive computing task, so that the cloud-side device determines the first neural network model based on the function information.

Optionally, in an embodiment, a computation amount and a required storage capacity of the second neural network model are respectively less than a computation amount and a required storage capacity of the first neural network model.

In one embodiment of this application, the processing module 930 may be implemented by a processor or a processor-related circuit. The sending module 910 may be implemented by a transmitter or a transmitter-related circuit. The receiving module 920 may be implemented by a receiver or a receiver-related circuit.

Figure 13:
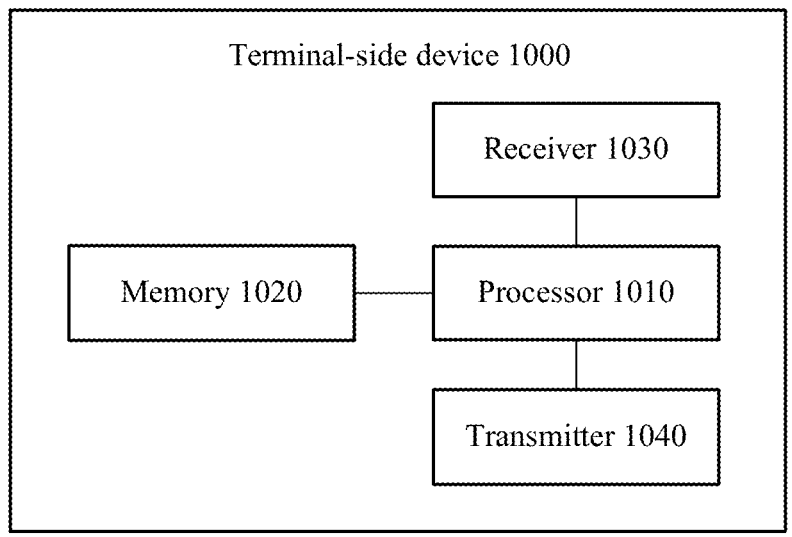
FIG. 13 is another schematic block diagram of a terminal-side device according to an embodiment of this application.

As shown in FIG. 13, an embodiment of this application further provides a terminal-side device 1000. The terminal-side device 1000 includes a processor 1010, a memory 1020, a receiver 1030, and a transmitter 1040. The processor 1010, the memory 1020, the receiver 1030, and the transmitter 1040 communicate with each other by using an internal connection path. The memory 1020 is configured to store an instruction. The processor 1010 is configured to execute the instruction stored in the memory 1020, so as to control the receiver 1030 to receive a signal and control the transmitter 1040 to send a signal. The transmitter 1040 is configured to send a request message to a cloud-side device, where the request message is used to request a neural network model used to process a cognitive computing task; the receiver 1030 is configured to receive a second neural network model that is obtained by trimming a first neural network model and that is sent by the cloud-side device, where the first neural network model is a neural network model on the cloud-side device that is used to process the cognitive computing task, and a hardware resource required when the second neural network model runs is within an available hardware resource capability range of the terminal-side device; and the processor 1010 is configured to process the cognitive computing task based on the second neural network model.

In one embodiment of this application, the terminal-side device requests, from the cloud-side device, the neural network model used to process the cognitive computing task, and after trimming the neural network model capable of processing the cognitive computing task, the cloud-side device delivers the trimmed neural network model to the terminal-side device, where a hardware resource required when the trimmed neural network model runs is within the available hardware resource capability range of the terminal-side device, so that a neural network model that originally runs on the cloud-side device with a strong computing capability can also be applicable to the terminal-side device with a relatively weak computing capability, and the terminal-side device can process the cognitive computing task. Therefore, this embodiment of this application can improve performance of processing a neural network-related application by the terminal-side device, and help enhance expansion of an intelligent application capability of the terminal-side device.

Optionally, in an embodiment, the terminal-side device includes a neural network basic platform, the neural network basic platform includes a neural network architecture component and a neural network parameter component, and the neural network architecture component is decoupled from the neural network parameter component. The processor 1010 is specifically configured to: when the second neural network model includes an architecture update component, update the neural network architecture component based on the architecture update component; when the second neural network model includes a parameter update component, update the neural network parameter component based on the parameter update component; and process the cognitive computing task based on an updated neural network basic platform.

Optionally, in an embodiment, the transmitter 1040 is configured to send the request message to the cloud-side device under any one of the following conditions: the terminal-side device lacks a neural network model used to process the cognitive computing task; accuracy of processing the cognitive computing task by using a neural network model on the terminal-side device does not meet cognitive accuracy tolerance; or a hardware resource required when a neural network model on the terminal-side device that is used to process the cognitive computing task runs exceeds an available hardware resource capability of the terminal-side device, where the cognitive accuracy tolerance represents expected accuracy of processing the cognitive computing task by the terminal-side device.

Optionally, in an embodiment, the request message carries indication information used to indicate the cognitive accuracy tolerance, so that the cloud-side device trims the first neural network model to obtain the second neural network model that meets the cognitive accuracy tolerance, where the cognitive accuracy tolerance represents the expected accuracy of processing the cognitive computing task by the terminal-side device.

Optionally, in an embodiment, the request message carries indication information used to indicate the available hardware resource capability of the terminal-side device.

Optionally, in an embodiment, the request message further carries an identifier used to indicate the first neural network model, so that the cloud-side device determines the first neural network model based on the identifier; or the request message further carries function information, and the function information is used to describe a function of processing the cognitive computing task, so that the cloud-side device determines the first neural network model based on the function information.

Optionally, in an embodiment, a computation amount and a required storage capacity of the second neural network model are respectively less than a computation amount and a required storage capacity of the first neural network model.

It should be understood that the terminal-side device 900 shown in FIG. 12 or the terminal-side device 1000 shown in FIG. 13 may be configured to perform an operation or a procedure related to the terminal-side device in the method embodiment, and operations and/or functions of the modules in the terminal-side device 900 or the terminal-side device 1000 are separately used to implement a corresponding procedure in the method embodiment. For brevity, details are not described herein again.

Figure 14:
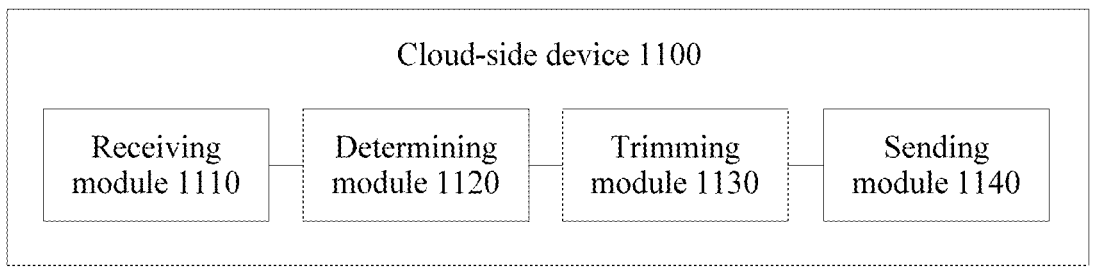
FIG. 14 is a schematic block diagram of a cloud-side device according to an embodiment of this application.

FIG. 14 is a schematic block diagram of a cloud-side device 1100 according to an embodiment of this application. The cloud-side device 1100 includes:

a receiving module 1110, configured to receive a request message sent by a terminal-side device, where the request message is used to request a neural network model used to process a cognitive computing task;

a determining module 1120, configured to determine, based on the request message, a first neural network model used to process the cognitive computing task;

a trimming module 1130, configured to trim the first neural network model to obtain a second neural network model, where a hardware resource required when the second neural network model runs is within an available hardware resource capability range of the terminal-side device; and a sending module 1140, configured to send the second neural network model to the terminal-side device, so that the terminal-side device processes the cognitive computing task based on the second neural network model.

In this embodiment of this application, the terminal-side device requests, from the cloud-side device, the neural network model used to process the cognitive computing task, and after trimming the neural network model capable of processing the cognitive computing task, the cloud-side device delivers the trimmed neural network model to the terminal-side device, where a hardware resource required when the trimmed neural network model runs is within the available hardware resource capability range of the terminal-side device, so that a neural network model that originally runs on the cloud-side device with a strong computing capability can also be applicable to the terminal-side device with a relatively weak computing capability, and the terminal-side device can process the cognitive computing task. Therefore, this embodiment of this application can improve performance of processing a neural network-related application by the terminal-side device, and help enhance expansion of an intelligent application capability of the terminal-side device.

Optionally, in an embodiment, the trimming module 1130 is configured to trim a parameter component of the first neural network model to obtain the second neural network model, where a required storage capacity of a parameter component of the second neural network model is less than a required storage capacity of the parameter component of the first neural network model.

Optionally, in an embodiment, the trimming module 1130 is configured to: trim an architecture component of the first neural network model to obtain a third neural network model, where a computation amount of a computation kernel of the third neural network model is less than a computation amount of a computation kernel of the first neural network model; and trim a parameter component of the third neural network model to obtain the second neural network model, where a required storage capacity of a parameter component of the second neural network model is less than a required storage capacity of the parameter component of the third neural network model.

Optionally, in an embodiment, the request message carries indication information used to indicate cognitive accuracy tolerance, and the cognitive accuracy tolerance represents expected accuracy of processing the cognitive computing task by the terminal-side device.

The trimming module 1130 is configured to trim, based on the cognitive accuracy tolerance, the first neural network model to obtain the second neural network model, where accuracy of processing the cognitive computing task by using the second neural network model meets the cognitive accuracy tolerance.

Optionally, in an embodiment, the request message carries indication information used to indicate an available hardware resource capability of the terminal-side device.

Optionally, in an embodiment, the request message further carries an identifier used to indicate the first neural network model.

The determining module 1120 is specifically configured to determine the first neural network model based on the identifier.

Optionally, in an embodiment, the request message further carries function information, and the function information is used to describe a function of processing the cognitive computing task.

The determining module is specifically configured to determine the first neural network model based on the function information.

Optionally, in an embodiment, a computation amount and a required storage capacity of the second neural network model are respectively less than a computation amount and a required storage capacity of the first neural network model.

Specifically, in one embodiment of this application, the determining module 1120 and the trimming module 1130 may be implemented by a processor or a processor-related circuit. The receiving module 1110 may be implemented by a receiver or a receiver-related circuit. The sending module 1140 may be implemented by a transmitter or a transmitter-related circuit.

Figure 15:
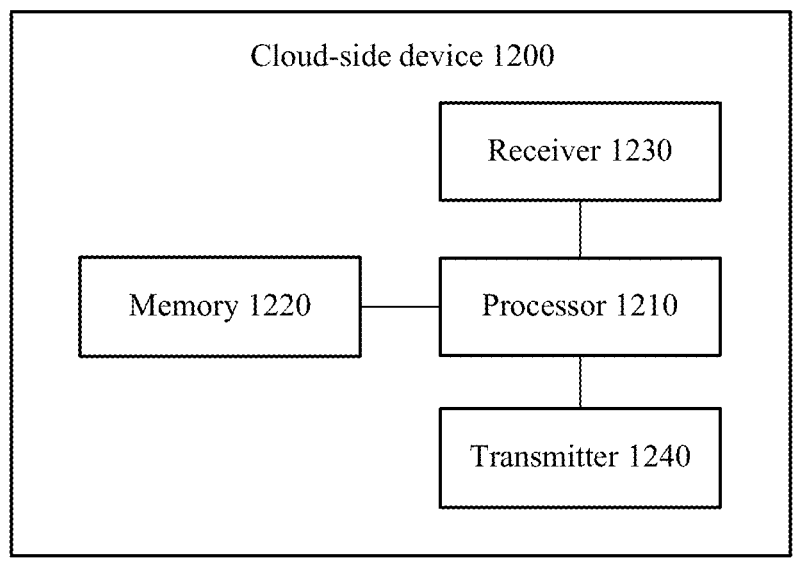
FIG. 15 is another schematic block diagram of a cloud-side device according to an embodiment of this application.

As shown in FIG. 15, an embodiment of this application further provides a cloud-side device 1200. The cloud-side device 1200 includes a processor 1210, a memory 1220, a receiver 1230, and a transmitter 1240. The processor 1210, the memory 1220, the receiver 1230, and the transmitter 1240 communicate with each other by using an internal connection path. The memory 1220 is configured to store an instruction. The processor 1210 is configured to execute the instruction stored in the memory 1220, so as to control the receiver 1230 to receive a signal and control the transmitter 1240 to send a signal. The receiver 1230 is configured to receive a request message sent by a terminal-side device, where the request message is used to request a neural network model used to process a cognitive computing task; the processor 1210 is configured to: determine, based on the request message, a first neural network model used to process the cognitive computing task; and trim the first neural network model to obtain a second neural network model, where a hardware resource required when the second neural network model runs is within an available hardware resource capability range of the terminal-side device; and the transmitter 1240 is configured to send the second neural network model to the terminal-side device, so that the terminal-side device processes the cognitive computing task based on the second neural network model.

In one embodiment of this application, the terminal-side device requests, from the cloud-side device, the neural network model used to process the cognitive computing task, and after trimming the neural network model capable of processing the cognitive computing task, the cloud-side device delivers the trimmed neural network model to the terminal-side device, where a hardware resource required when the trimmed neural network model runs is within the available hardware resource capability range of the terminal-side device, so that a neural network model that originally runs on the cloud-side device with a strong computing capability can also be applicable to the terminal-side device with a relatively weak computing capability, and the terminal-side device can process the cognitive computing task. Therefore, this embodiment of this application can improve performance of processing a neural network-related application by the terminal-side device, and help enhance expansion of an intelligent application capability of the terminal-side device.

Optionally, in an embodiment, the processor 1210 is configured to trim a parameter component of the first neural network model to obtain the second neural network model, where a required storage capacity of a parameter component of the second neural network model is less than a required storage capacity of the parameter component of the first neural network model.

Optionally, in an embodiment, the processor 1210 is configured to: trim an architecture component of the first neural network model to obtain a third neural network model, where a computation amount of a computation kernel of the third neural network model is less than a computation amount of a computation kernel of the first neural network model; and trim a parameter component of the third neural network model to obtain the second neural network model, where a required storage capacity of a parameter component of the second neural network model is less than a required storage capacity of the parameter component of the third neural network model.

Optionally, in an embodiment, the request message carries indication information used to indicate cognitive accuracy tolerance, and the cognitive accuracy tolerance represents expected accuracy of processing the cognitive computing task by the terminal-side device.

The processor 1210 is specifically configured to trim, based on the cognitive accuracy tolerance, the first neural network model to obtain the second neural network model, where accuracy of processing the cognitive computing task by using the second neural network model meets the cognitive accuracy tolerance.

Optionally, in an embodiment, the request message carries indication information used to indicate an available hardware resource capability of the terminal-side device.

Optionally, in an embodiment, the request message further carries an identifier used to indicate the first neural network model.

The processor 1210 is configured to determine the first neural network model based on the identifier.

Optionally, in an embodiment, the request message further carries function information, and the function information is used to describe a function of processing the cognitive computing task.

The processor 1210 is configured to determine the first neural network model based on the function information.

Optionally, in an embodiment, a computation amount and a required storage capacity of the second neural network model are respectively less than a computation amount and a required storage capacity of the first neural network model.

It should be understood that the cloud-side device 1100 shown in FIG. 14 or the cloud-side device 1200 shown in FIG. 15 may be configured to perform an operation or a procedure related to the cloud-side device in the method embodiment, and operations and/or functions of the modules in the cloud-side device 1100 or the cloud-side device 1200 are separately used to implement a corresponding procedure in the method embodiment. For brevity, details are not described herein again.

Figure 16:
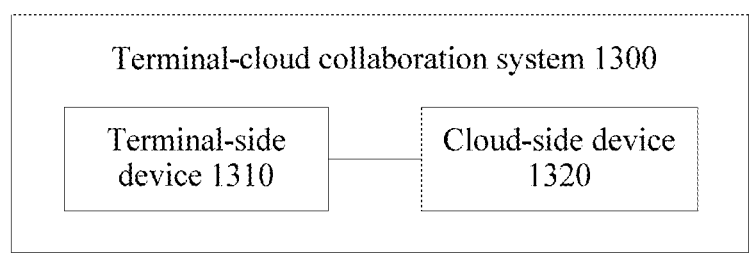
FIG. 16 is yet another schematic block diagram of a terminal-cloud collaboration system according to an embodiment of this application.

FIG. 16 is a schematic block diagram of a terminal-cloud collaboration system 1300 according to an embodiment of this application. The terminal-cloud collaboration system 1300 includes a terminal-side device 1310 and a cloud-side device 1320. The terminal-side device 1310 is corresponding to the terminal-side device 900 or the terminal-side device 1000 in the foregoing embodiment, and the cloud-side device 1320 is corresponding to the cloud-side device 1100 or the cloud-side device 1200 in the foregoing embodiment.

In one embodiment of this application, the terminal-side device requests, from the cloud-side device, a neural network model used to process a cognitive computing task, and after trimming the neural network model capable of processing the cognitive computing task, the cloud-side device delivers the trimmed neural network model to the terminal-side device, where a hardware resource required when the trimmed neural network model runs is within an available hardware resource capability range of the terminal-side device, so that a neural network model that originally runs on the cloud-side device with a strong computing capability can also be applicable to the terminal-side device with a relatively weak computing capability, and the terminal-side device can process the cognitive computing task. Therefore, this embodiment of this application can improve performance of processing a neural network-related application by the terminal-side device, and help enhance expansion of an intelligent application capability of the terminal-side device.

It should be understood that, in this embodiment of this application, a processor may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that, in this embodiment of this application, a memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Based on a description that is used as an example instead of a limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that the memory (a storage module) is integrated in the processor when the processor is a general-purpose processor, a DSP, an ASIC, an FPGA, or another programmable logic device, a discrete gate or a transistor logic device, or a discrete hardware component.

It should be noted that the memory in the systems and methods described in this specification is intended to include but is not limited to these and any other proper types of memories.

It should be further understood that various numerical symbols related to this specification are differentiated merely for ease of description, but are not used to limit the scope of the embodiments of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of the embodiments of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for data processing, comprising:
    sending, by a terminal-side device, a request message to a cloud-side device, wherein the request message is used to request a neural network model to process a cognitive computing task;
    receiving, by the terminal-side device, a second neural network model obtained by trimming a first neural network model sent by the cloud-side device, wherein the first neural network model is on the cloud-side device that is used to process the cognitive computing task, and a hardware resource required to execute the second neural network model is within an available hardware resource capability range of the terminal-side device; and
    processing, by the terminal-side device, the cognitive computing task using the second neural network model.

2. The method according to claim 1, wherein the terminal-side device comprises a neural network basic platform, the neural network basic platform comprises a neural network architecture component and a neural network parameter component, and the neural network architecture component is decoupled from the neural network parameter component; and
    wherein processing the cognitive computing task using the second neural network model comprises:
        when the second neural network model comprises an architecture update component, updating the neural network architecture component based on the architecture update component;
        when the second neural network model comprises a parameter update component, updating the neural network parameter component based on the parameter update component; and
        processing the cognitive computing task using the neural network basic platform with the updated neural network architecture component and the updated neural network parameter component.

3. The method according to claim 1, wherein sending a the request message to the cloud-side device comprises:
    sending, by the terminal-side device, the request message to the cloud-side device in response to determining that:
        the terminal-side device lacks a neural network model used to process the cognitive computing task; or
        an accuracy of processing the cognitive computing task using a neural network model on the terminal-side device does not meet a cognitive accuracy tolerance, wherein the cognitive accuracy tolerance represents an expected accuracy of processing the cognitive computing task by the terminal-side device; or
        a hardware resource required to execute a neural network model on the terminal-side device to process the cognitive computing task exceeds the available hardware resource capability range of the terminal-side device.

4. The method according to claim 1, wherein the request message includes indication information used to indicate a cognitive accuracy tolerance, so that the cloud-side device trims the first neural network model to obtain the second neural network model that meets the cognitive accuracy tolerance, wherein the cognitive accuracy tolerance represents an expected accuracy of processing the cognitive computing task by the terminal-side device.

5. The method according to claim 1, wherein the request message includes indication information used to indicate the available hardware resource capability range of the terminal-side device.

6. The method according to claim 1, wherein the request message further includes an identifier identifying the first neural network model, so that the cloud-side device determines the first neural network model based on the identifier; or
    the request message further includes function information to describe a function of processing the cognitive computing task, so that the cloud-side device determines the first neural network model based on the function information.

7. The method according to claim 1, wherein a computation amount and a required storage capacity of the second neural network model are respectively less than a computation amount and a required storage capacity of the first neural network model.

8. A method for data processing, comprising:
    receiving, by a cloud-side device, a request message from a terminal-side device, to request a neural network model to process a cognitive computing task;
    determining, by the cloud-side device based on the request message, a first neural network model to process the cognitive computing task;
    trimming, by the cloud-side device, the first neural network model to obtain a second neural network model, wherein a hardware resource required to execute the second neural network model is within an available hardware resource capability range of the terminal-side device; and
    sending, by the cloud-side device, the second neural network model to the terminal-side device, so that the terminal-side device processes the cognitive computing task using the second neural network model.

9. The method according to claim 8, wherein the trimming the first neural network model to obtain the second neural network model comprises:
    trimming, by the cloud-side device, a parameter component of the first neural network model to obtain the second neural network model, wherein a required storage capacity of a parameter component of the second neural network model is less than a required storage capacity of the parameter component of the first neural network model.

10. The method according to claim 8, wherein the trimming the first neural network model to obtain the second neural network model comprises:
    trimming, by the cloud-side device, an architecture component of the first neural network model to obtain a third neural network model, wherein a computation amount of a computation kernel of the third neural network model is less than a computation amount of a computation kernel of the first neural network model; and
    trimming, by the cloud-side device, a parameter component of the third neural network model to obtain the second neural network model, wherein a required storage capacity of a parameter component of the second neural network model is less than a required storage capacity of the parameter component of the third neural network model.

11. The method according to claim 8, wherein the request message includes indication information to indicate a cognitive accuracy tolerance, and the cognitive accuracy tolerance represents an expected accuracy of processing the cognitive computing task by the terminal-side device; and
trimming the first neural network model to obtain the second neural network model comprises:
trimming, by the cloud-side device based on the cognitive accuracy tolerance, the first neural network model to obtain the second neural network model, wherein an accuracy of processing the cognitive computing task using the second neural network model meets the cognitive accuracy tolerance.

12. The method according to claim 8, wherein the request message includes indication information to indicate the available hardware resource capability range of the terminal-side device.

13. The method according to claim 8, wherein the request message further includes an identifier identifying the first neural network model; and
determining, by the cloud-side device based on the request message, a first neural network model used to process the cognitive computing task comprises:
determining, by the cloud-side device, the first neural network model based on the identifier.

14. The method according to claim 8, wherein the request message further includes function information to describe a function of processing the cognitive computing task; and
determining, by the cloud-side device based on the request message, the first neural network model used to process the cognitive computing task comprises:
determining, by the cloud-side device, the first neural network model based on the function information.

15. The method according to claim 8, wherein a computation amount and a required storage capacity of the second neural network model are respectively less than a computation amount and a required storage capacity of the first neural network model.

16. A terminal-side device for data processing, comprising:
at least one processor; and
a memory coupled to the processor, the memory including instructions executable by the at least one processor to:
send a request message to a cloud-side device to request a neural network model used to process a cognitive computing task;
receive a second neural network model that is obtained by trimming a first neural network model from the cloud-side device, wherein the first neural network model is on the cloud-side device used to process the cognitive computing task, and a hardware resource required to execute the second neural network model is within an available hardware resource capability range of the terminal-side device; and
process the cognitive computing task using the second neural network model.

17. The terminal-side device according to claim 16, wherein the terminal-side device comprises a neural network basic platform, the neural network basic platform comprises a neural network architecture component and a neural network parameter component, and the neural network architecture component is decoupled from the neural network parameter component; and
wherein the instructions are executable by the at least one processor further to:
when the second neural network model comprises an architecture update component, update the neural network architecture component based on the architecture update component;
when the second neural network model comprises a parameter update component, update the neural network parameter component based on the parameter update component; and
process the cognitive computing task using the neural network basic platform with the updated neural network architecture component and the updated neural network parameter component.

18. The terminal-side device according to claim 16, wherein the instructions are executable by the at least one processor to send the request message to the cloud-side device in response to determining that:
the terminal-side device lacks a neural network model used to process the cognitive computing task;
an accuracy of processing the cognitive computing task using a neural network model on the terminal-side device does not meet a cognitive accuracy tolerance; and
a hardware resource required to execute a neural network model on the terminal-side device to process the cognitive computing task exceeds the available hardware resource capability range of the terminal-side device, wherein the cognitive accuracy tolerance represents an expected accuracy of processing the cognitive computing task by the terminal-side device.

19. The terminal-side device according to claim 18, wherein the request message includes indication information to indicate the cognitive accuracy tolerance, so that the cloud-side device trims the first neural network model to obtain the second neural network model that meets the cognitive accuracy tolerance, wherein the cognitive accuracy tolerance represents the expected accuracy of processing the cognitive computing task by the terminal-side device.

20. The terminal-side device according to claim 16, wherein the request message includes indication information to indicate the available hardware resource capability range of the terminal-side device.

21. The terminal-side device according to claim 16, wherein the request message further includes an identifier identifying the first neural network model, so that the cloud-side device determines the first neural network model based on the identifier; or
the request message further includes function information to describe a function of processing the cognitive computing task, so that the cloud-side device determines the first neural network model based on the function information.

22. The terminal-side device according to claim 16, wherein a computation amount and a required storage capacity of the second neural network model are respectively less than a computation amount and a required storage capacity of the first neural network model.

23. A cloud-side device for data processing, comprising:
at least one processor; and
a memory coupled to the processor, the memory including instructions executable by the at least one processor to:
receive a request message from a terminal-side device to request a neural network model used to process a cognitive computing task;

determine, based on the request message, a first neural network model to process the cognitive computing task;

trim the first neural network model to obtain a second neural network model, wherein a hardware resource required to execute the second neural network model is within an available hardware resource capability range of the terminal-side device; and send the second neural network model to the terminal-side device, so that the terminal-side device processes the cognitive computing task based on the second neural network model.

24. The cloud-side device according to claim 23, wherein the instructions are executable by the at least one processor to trim a parameter component of the first neural network model to obtain the second neural network model, wherein a required storage capacity of a parameter component of the second neural network model is less than a required storage capacity of the parameter component of the first neural network model.

25. The cloud-side device according to claim 23, wherein the instructions are executable by the at least one processor to:

trim an architecture component of the first neural network model to obtain a third neural network model, wherein a computation amount of a computation kernel of the third neural network model is less than a computation amount of a computation kernel of the first neural network model; and trim a parameter component of the third neural network model to obtain the second neural network model, wherein a required storage capacity of a parameter component of the second neural network model is less than a required storage capacity of the parameter component of the third neural network model.

26. The cloud-side device according to claim 23, wherein the request message includes indication information to indicate a cognitive accuracy tolerance representing an expected accuracy of processing the cognitive computing task by the terminal-side device; and wherein the instructions are executable by the at least one processor to trim, based on the cognitive accuracy tolerance, the first neural network model to obtain the second neural network model, wherein an accuracy of processing the cognitive computing task using the second neural network model meets the cognitive accuracy tolerance.

27. The cloud-side device according to claim 23, wherein the request message includes indication information to indicate the available hardware resource capability range of the terminal-side device.

28. The cloud-side device according claim 23, wherein the request message further includes an identifier identifying the first neural network model; and wherein the instructions are executable by the at least one processor to determine the first neural network model based on the identifier.

29. The cloud-side device according to claim 23, wherein the request message further includes function information to describe a function of processing the cognitive computing task; and wherein the instructions are executable by the at least one processor to determine the first neural network model based on the function information.

30. The cloud-side device according to claim 23, wherein a computation amount and a required storage capacity of the second neural network model are respectively less than a computation amount and a required storage capacity of the first neural network model.

31. A terminal-cloud collaboration system, comprising the terminal-side device according to claim 16.

* * * * *